United States Patent
Mische

(10) Patent No.: US 11,309,596 B1
(45) Date of Patent: Apr. 19, 2022

(54) INFRARED THERMAL RUN-AWAY DETECTION FOR BATTERY PACKS

(71) Applicant: Amazon Technologies, Inc., Seattle, WA (US)

(72) Inventor: William Mische, Auburn, WA (US)

(73) Assignee: Amazon Technologies, Inc., Seattle, WA (US)

(*) Notice: Subject to any disclaimer, the term of this patent is extended or adjusted under 35 U.S.C. 154(b) by 206 days.

(21) Appl. No.: 16/835,094

(22) Filed: Mar. 30, 2020

(51) Int. Cl.
| | |
|---|---|
| H01M 4/02 | (2006.01) |
| H01M 10/48 | (2006.01) |
| H01M 10/44 | (2006.01) |
| B64C 39/02 | (2006.01) |
| B60L 58/24 | (2019.01) |
| G01J 5/10 | (2006.01) |
| H02J 7/00 | (2006.01) |
| H01M 50/20 | (2021.01) |
| G01J 5/00 | (2022.01) |
| G05D 1/10 | (2006.01) |
| B60K 6/28 | (2007.10) |

(52) U.S. Cl.
CPC .......... *H01M 10/486* (2013.01); *B60L 58/24* (2019.02); *B64C 39/024* (2013.01); *G01J 5/10* (2013.01); *H01M 10/441* (2013.01); *H01M 10/443* (2013.01); *H01M 10/482* (2013.01); *H01M 50/20* (2021.01); *H02J 7/0031* (2013.01); *H02J 7/00309* (2020.01); *B60K 6/28* (2013.01); *B60Y 2200/91* (2013.01); *B60Y 2200/92* (2013.01); *G01J 2005/0077* (2013.01); *G05D 1/101* (2013.01); *H01M 2220/20* (2013.01)

(58) Field of Classification Search
CPC ....................................................... H01M 4/02
See application file for complete search history.

(56) References Cited

U.S. PATENT DOCUMENTS

2016/0272112 A1* 9/2016 DeGrazia ................. B60Q 9/00

OTHER PUBLICATIONS

U.S. Appl. No. 16/835,130, "Thermistor-Based Thermal Run-Away Detection for Battery Packs," filed Mar. 30, 2020.

* cited by examiner

*Primary Examiner* — Jacob B Marks
(74) *Attorney, Agent, or Firm* — Kilpatrick Townsend & Stockton LLP

(57) ABSTRACT

Systems and methods for identifying thermal run-away events in a battery pack can include using infrared sensors to measure infrared radiation emitted by and reflected by subsets of the battery cells arrayed in a battery pack. Each infrared sensor can generate temperature data based on the received infrared radiation, which includes reflected infrared radiation for several and potentially many individual battery cells aligned in rows or columns within the battery pack. Each infrared sensor can sense the beginning of a thermal run-away event by sensing when an individual battery cell in the array has a temperature exceeding a threshold, and can generate a signal indicative of a thermal run-away event based on the detected excessive temperature.

20 Claims, 18 Drawing Sheets

INFRARED THERMAL RUN-AWAY DETECTION FOR BATTERY PACKS

BACKGROUND

Electric vehicles have been developed for a wide variety of personal and industrial tasks including personal transportation, commercial transportation, entertainment, and industrial applications. One example of an electric vehicle that has become commonplace is the remote-controlled or semi-autonomous unmanned aerial vehicle (UAV). UAVs may have significant applications in personal use (e.g., for entertainment) but may also have significant commercial applications as platforms for videography, for moving inventory in supply chain facilities, or even for carrying parcels in commercial delivery. Increasingly, personal and commercial vehicles also include electric or hybrid electric drive trains, and or increasingly offered with autonomous features. As operational requirements of electric vehicles have increased, power requirements have also increased, leading to a need for reliable, high-density power supplies. Conventional high-density power supplies contain numerous individual cells, which are spaced apart to manage heat and to prevent battery cells from overheating or entering thermal run-away conditions. However, as the demand for power density increases, new solutions for temperature management are needed.

BRIEF DESCRIPTION OF THE DRAWINGS

Various embodiments in accordance with the present disclosure will be described with reference to the drawings, in which.

DETAILED DESCRIPTION

Figure 1:
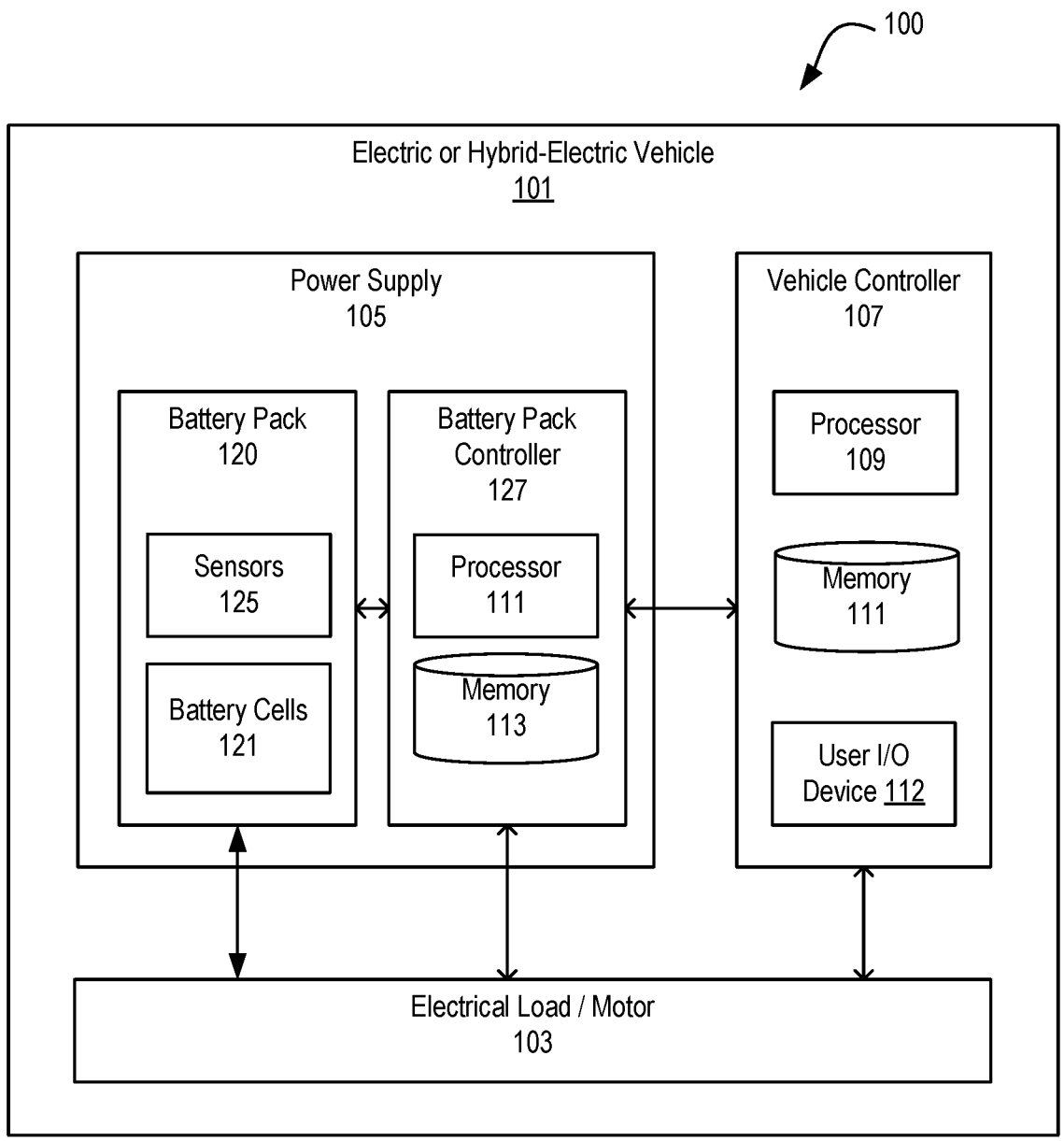
FIG. 1 illustrates an example system for detecting thermal run-away in the battery pack of an electric or hybrid electric vehicle, in accordance with various embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

The internal structure of a high-density battery includes a cavity containing an array of individual battery cells. The cells generate heat while charging or discharging, which, uncontrolled, can lead to thermal run-away events in which thermal overload causes uncontrolled discharge (e.g., a short circuit) that further increases temperature, leading to battery failure. Thermal run-away events are prevented by increasing the amount of spacing between individual battery cells or by shutting down the process using the battery when thermal run-away is detected. However, increasing the amount of spacing decreases the cell density and therefore the power density of the battery, and shutting down a battery suddenly can be dangerous in the context of electric vehicles, automated vehicles, or UAVs. For example, sudden battery failure of a UAV when flying under load or when flying above people can pose a risk of an unexpected crash. Battery packs for vehicles, UAVs, or other high-performance devices may be required to output 10's of kWs to 100's of kWs, and may include arrays of hundreds or thousands of individual battery cells. Each one of these individual battery cells has the potential to enter thermal run-away in response to, e.g., manufacturing defects, degradation as the cells age, local shorts caused by damage or abuse of the battery pack, or variability in the way that the cells are used or cooled during use.

Embodiments herein are directed to systems and methods for sensing precursor conditions to a thermal run-away event at the level of individual battery cells in a battery, in order to anticipate thermal run-away with sufficient time to prevent sudden battery failure, or in order to detect and isolate thermal run-away to a particular problem cell in order to minimize damage to the battery as a whole. Specifically, embodiments herein are directed to a battery structure, and to methods of detecting the beginnings of thermal run-away, at individual battery cells in a high density battery by sensing temperature change within the array of battery cells.

According to at least some embodiments, temperature changes in individual battery cells of an array of battery cells can be detected using infrared sensors positioned within the array of battery cells in order to receive reflected infrared radiation from within the array to facilitate the detection of thermal run-away at a single battery cell, before the temperature of the battery as a whole has changed enough for detection. These methods are advantageous over conventional temperature monitoring for the additional reason that, whereas the temperature of the battery as a whole may change routinely as the battery is placed under load or charged, the temperature of the individual battery cells should change in tandem with each other. Therefore, detecting sudden temperature spikes at the level of individual battery cells can greatly improve the accuracy of detecting a thermal run-away event.

According to various other embodiments, temperature changes in individual battery cells of an array of battery cells can be detected using a string or a mesh arrangement of temperature sensors that can be routed through the array of battery cells and connected with some or all of the battery cells. The string or mesh of temperature sensors can detect sudden changes in temperature caused by isolated temperature spikes in individual battery cells before the temperature of the battery as a whole has noticeably risen.

FIG. 1 is a simplified block diagram illustrating an example system 100 for detecting thermal run-away in the battery pack of an electric or hybrid electric vehicle 101, in accordance with various embodiments. The electric or hybrid electric vehicle 101 includes a power supply 105 that is operable to supply electrical power to the electrical load or motor 103 under the control of the vehicle controller 107. The vehicle controller 107 can include one or more processors 109 and a memory device 111 containing executable instructions that, when executed by the processor, configure the vehicle controller to manage an output of the power supply 105 to the electrical load or motor 103, manage return power that may be supply by the electrical motor (e.g., in the case of regenerative braking) to the power supply. According to some embodiments, e.g. where the electric or hybrid electric vehicle is autonomous or semiautonomous, the vehicle controller 107 may be further configured to take control of the vehicle including the management of acceleration and braking, steering, and navigation. The electrical load or motor 103 can include any suitable electric motor for use in the drivetrain of electric or hybrid electric vehicle such as an AC electric motor or a DC electric motor. The electrical load 103 may further include other types of power draws, including computer systems on board the electric or hybrid electric vehicle 101, entertainment devices, air conditioning, heating, or any other suitable power draw. The vehicle controller 107 may be further connected with the user input/output device 112 that can take commands from an operator of the electric or hybrid electric vehicle 101, or can relay information from the control system 100 for display to the operator. The user input/output device 112 can include any suitable display screen, keyboard, touchpad, voice recognition system or software, or other suitable control system or feedback system.

According to various embodiments, the power supply 105 can include a battery pack 120 and a battery pack controller 127 that manages output from the battery pack. The battery pack 120 includes an array of battery cells 121. The battery cells 121 are typically elongate battery cells that are arranged in a closely packed array with air-filled space between the battery cells for exhausting heat and thermally isolating the battery cells from each other. According to various embodiments, the battery cells 121 are cylindrical battery cells that are sandwiched between substantially planar enclosure elements. According to some embodiments, the array of battery cells 121 are lithium ion battery cells. The battery pack 120 can be configured to provide a substantial range of different power outputs, depending on the type and number of battery cells 121 included in the array battery cells. The number of battery cells 121 contained in the battery pack 120 can vary from hundreds of individual battery cells to potentially thousands of individual battery cells, and provide power outputs ranging from tens of kilowatts of power up to hundreds of kilowatts of power.

The battery pack controller 127 can include additional processing ability via an onboard processor 111 and a memory device 113 containing executable instructions that manage the operation of the battery pack controller. According to some embodiments, the battery pack controller 127 can be a printed circuit board (PCB) that is lightweight and low voltage, that interfaces with the battery cells 121 to monitor voltage output and capacity, and interfaces with sensors 125 within the battery pack 122 detects thermal variation and for early detection of thermal run-away events.

The battery pack 120 includes sensors 125 that are positioned adjacent the battery cells 121 or connected with the battery cells to sense temperature variations of the individual battery cells within the battery pack. According to various embodiments, the sensors 125 can include infrared sensors that monitor an interior of the battery pack for infrared radiation indicative of temperatures above a threshold temperature. According to various other embodiments, the sensors 125 can include sensing circuits made up of thermistors that are attached to groups or subsets of the battery cells 121 in order to detect the occurrence of thermal run-away events in the battery cells before thermal failure has spread to the entire battery pack 120.

The principal components described above with reference to the example electric or hybrid electric vehicle 101 can apply to a variety of electric vehicles and unmanned aerial vehicles described below. Variations of the battery control systems for detecting thermal run-away in preventing damage due to thermal run-away events are described below with references to FIGS. 2 and 3, which illustrate, respectively, a control system 200 for a battery powered UAV 201, and a control system 300 for a battery powered autonomous or semiautonomous vehicle 301. In addition, it will be understood that the components and principles described herein apply to a variety of vehicles that utilize electric power, including trains, ships, robotic devices, robotic drive units, and other suitable electronic devices.

Figure 2:
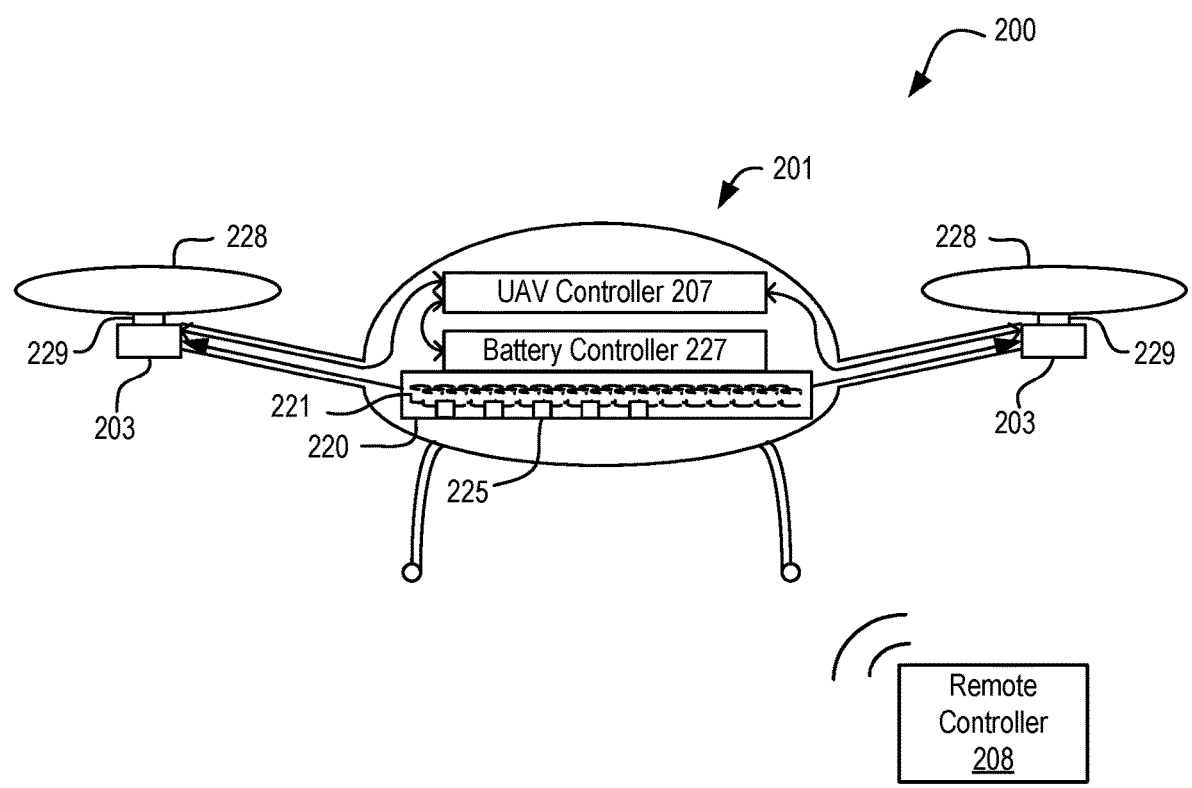
FIG. 2 illustrates an example system for detecting thermal run-away in the battery pack of an unmanned aerial vehicle (UAV), in accordance with embodiments.

FIG. 2 illustrates an example system 200 for detecting thermal run-away in the battery pack 220 of an unmanned aerial vehicle (UAV) 201, in accordance with embodiments. The UAV 201 includes a power supply 205 that is operable to supply electrical power to the electric motors 203 under the control of the UAV controller 207. According to some embodiments, the UAV controller 207 may be further configured to take control of the vehicle including the management of acceleration, altitude, pitch, yaw, and any additional functions of the UAV such as landing, taking off, carrying items and releasing items, capturing video, or any other suitable function of a UAV. The electrical motors 203 can include any suitable electric motor for use in powering rotors 228 via rotor shafts 229 in order to propel the UAV 201, such as an AC electric motor or a DC electric motor. The UAV controller 207 may be further connected with a remote controller 208, such as a hand-held user operated remote control device, or a ground-based navigation system.

According to various embodiments, the power supply 205 can include a battery pack 220 and a battery pack controller 227 that manages output from the battery pack. The battery pack 220 includes an array of battery cells 221. The battery cells 221 are typically elongate battery cells that are arranged in a closely packed array with air-filled space between the battery cells for exhausting heat and thermally isolating the battery cells from each other. According to various embodiments, the battery cells 221 are cylindrical battery cells that are sandwiched between substantially planar enclosure elements. According to some embodiments, the array of battery cells 221 are lithium ion battery cells.

The battery pack 220 includes sensors 225 that are positioned adjacent the battery cells 221 or connected with the battery cells to sense temperature variations of the individual battery cells within the battery pack. According to various embodiments, the sensors 225 can include infrared sensors that monitor an interior of the battery pack for infrared radiation indicative of temperatures above a threshold temperature. According to various other embodiments, the sensors 225 can include sensing circuits made up of thermistors that are attached to groups or subsets of the battery cells 221 in order to detect the occurrence of thermal run-away events in the battery cells before thermal failure has spread to the entire battery pack 220.

Figure 3:
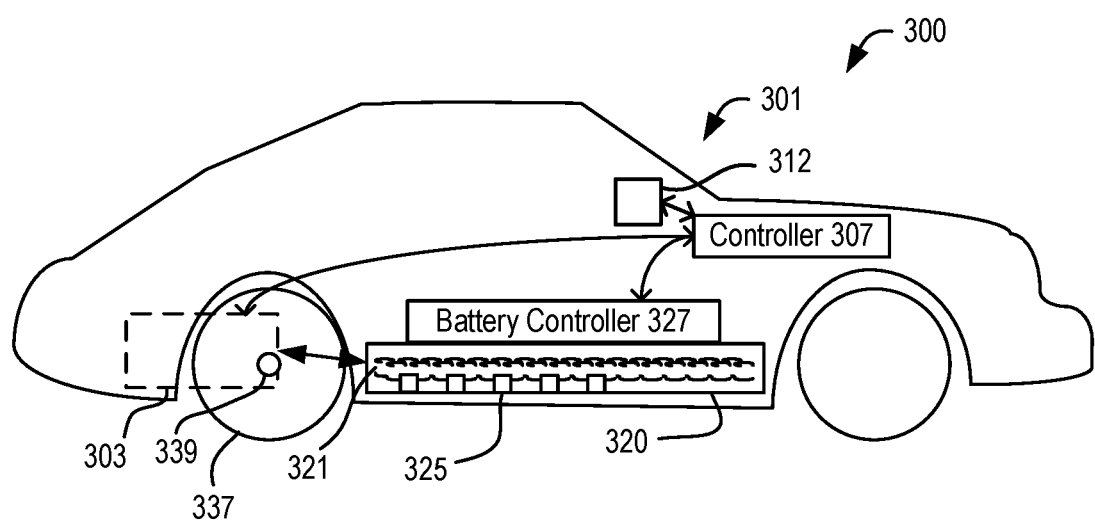
FIG. 3 illustrates an example system for detecting thermal run-away in the battery pack of an autonomous or semiautonomous electric vehicle, in accordance with embodiments.

FIG. 3 illustrates an example system 300 for detecting thermal run-away in the battery pack 320 of an autonomous or semiautonomous electric vehicle 301, in accordance with embodiments. The autonomous or semi-autonomous vehicle 301 includes a power supply 305 that is operable to supply electrical power to the electric motors 303 in the drive train of the autonomous or semiautonomous vehicle, under the control of the vehicle controller 307. According to some embodiments, the vehicle controller 307 may be further configured to take control of the vehicle including the management of acceleration and braking, steering, and navigation. The electrical motors 303 can include any suitable electric motor for use in delivering power to the wheels 337 of the vehicle 301 via the drive train or axle 339, in order to propel the autonomous or semi-autonomous vehicle 301, such as an AC electric motor or a DC electric motor. The vehicle controller 307 may be further connected with the user input/output device 312 that can take commands from an operator of the electric or hybrid electric vehicle 301, or can relay information from the control system 300 for display to the operator. The user input/output device 312 can include any suitable display screen, keyboard, touchpad, voice recognition system or software, or other suitable control system or feedback system.

According to various embodiments, the power supply 305 can include a battery pack 320 and a battery pack controller 327 that manages output from the battery pack. The battery pack 320 includes an array of battery cells 321. The battery cells 321 are typically elongate battery cells that are arranged in a closely packed array with air-filled space between the battery cells for exhausting heat and thermally isolating the battery cells from each other. According to various embodiments, the battery cells 321 are cylindrical battery cells that are sandwiched between substantially planar enclosure elements. According to some embodiments, the array of battery cells 321 are lithium ion battery cells.

The battery pack 320 includes sensors 325 that are positioned adjacent the battery cells 321 or connected with the battery cells to sense temperature variations of the individual battery cells within the battery pack. According to various embodiments, the sensors 325 can include infrared sensors that monitor an interior of the battery pack for infrared radiation indicative of temperatures above a threshold temperature. According to various other embodiments, the sensors 325 can include sensing circuits made up of thermistors that are attached to groups or subsets of the battery cells 321 in order to detect the occurrence of thermal run-away events in the battery cells before thermal failure has spread to the entire battery pack 320.

Figure 4:
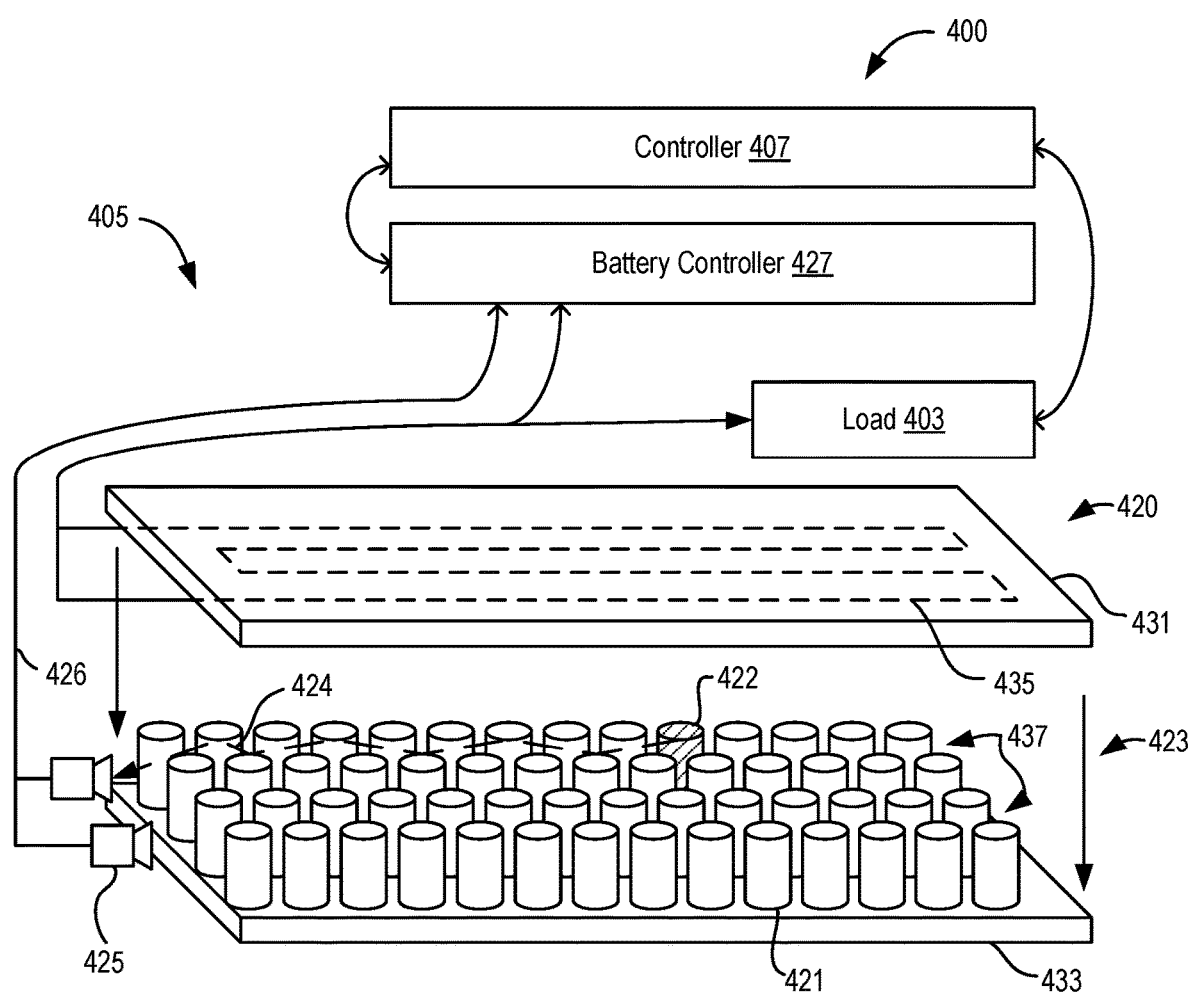
FIG. 4 illustrates an example of a battery control system for detecting thermal run-away in a battery pack using infrared sensors, in accordance with embodiments.

FIG. 4 illustrates an example of a battery control system 400 for detecting thermal run-away in a battery pack 420 using infrared sensors 425, in accordance with embodiments. The battery control system 400 includes a controller 407 that manages delivery of electrical power from a power supply 405 to a load 403. The load 403 can be any suitable load described above, such as but not limited to a motor of an electric vehicle or hybrid electric vehicle, a UAV, any electrical system associated with an electrical vehicle, UAV, or any suitable stationary system that draws electrical power from a battery pack made up of an array of battery cells.

The battery pack 420 includes an array of battery cells 421 that are closely packed but spaced apart from each other to allow airflow between the battery cells for cooling, electrical isolation, and/or thermal isolation. The array of battery cells 421 can be packed according to a rectangular grid, according to a hexagonal or triangular grid, or according to any other suitable repeating arrangement. According to at least some embodiments, the array of battery cells 421 are spaced apart sufficiently to provide open conduits 437 between adjacent battery cells that allow infrared radiation to reflect between the battery cells along the open channels. The battery cells 421 are secured within an enclosure 423 that includes at least a top enclosure element 431 and a bottom enclosure element 433 that are connected to the array of battery cells from above and below. The top enclosure element 431 and the bottom enclosure element 433 can include printed or attached circuitry 435 for electrically connecting the battery cells 421 together and with the battery controller 427 and the load 403. The circuitry 435 can take a variety of forms in order to create any suitable number of parallel subsets of battery cells within the battery pack 420, any suitable number of series subsets of battery cells within the battery pack, or any suitable combination in order to produce a battery pack that has an appropriate voltage and capacity.

The top enclosure element 431 and the bottom enclosure element 433, together with the battery cells for 21, define open conduits 437 between the battery cells. These open conduits 437 are able to reflect infrared light emitted from individual battery cells 421 along the conduits. According to some embodiments, the battery cells 421 can include outer shells, outer surface coatings, or can be formed of a material that is infrared-reflective. Some suitable infrared reflective materials include, e.g., aluminum, and various infrared reflective pigments. According to some other embodiments, interior surfaces of the top enclosure element 431 and the bottom enclosure element four and 33 may also or alternatively include surface coatings that are infrared reflective or can be composed of infrared reflective materials. According to various embodiments, exterior surfaces of the battery cells 421, interior surfaces of the top enclosure element 431 and bottom enclosure element 433, or any suitable combination thereof, can have an infrared reflectivity coefficient of at least 0.2.

The power supply 405 includes a battery pack 420 managed by the controller 407 and/or a local battery controller 427. The battery controller 427 can be a PCB that can monitor electrical characteristics of the battery pack 420, including but not limited to power output from the battery pack, voltages or currents across the battery pack, voltages or currents across the battery cells 421, or other parameters. According to various embodiments, the battery controller 427 can also monitor temperatures within the battery pack 420 in order to rapidly identify temperatures that exceed operational parameters of the individual battery cells 421. For example, according to various embodiments, the battery controller 427 is connected with one or with multiple infrared sensors 425. The infrared sensors 425 are positioned at ends of the conduits 437 and oriented toward the conduits to receive incident infrared radiation 424 that is emitted by the battery cells 421 adjacent to each conduit. When one of the battery cells 421 is damaged or overheats, and particularly when one of the battery cells enters a thermal run-away condition (e.g., overheated battery cell 422), the overheated battery cell emits infrared radiation at high intensity that is reflected along one of the conduits 437 and detected by one of the infrared sensors 425.

According to some embodiments, infrared sensors 425 can be strategically positioned at adjacent conduits 437, at every other conduit, or can even be positioned along adjacent or orthogonal sides of the battery pack 420 in order to obtain temperature data from more than one side of the battery pack. According to some embodiments, each one of the infrared sensors 425 can be connected directly with the battery controller 427, where the infrared sensors may each connect with a respective dedicated processor for receiving the temperature data, or alternatively, where the infrared sensors may each connect with a common processor that collects the temperature data from any number or from all of the infrared sensors. According to some embodiments, the infrared sensors 425 can all be connected to a common bus 426, e.g., via the use of an and-on cord, or other suitable connection.

According to some embodiments, the temperature data from each one of the infrared sensors can be processed separately and temperature data from each sensor can be compared against threshold temperature data, where a signal exceeding the threshold temperature data is indicative of a high temperature along one of the conduits 437 indicative of a thermal run-away condition. According to some other embodiments, the temperature data from each one of the infrared sensors 425 can be processed together, or merged, to a single data structure, and a thermal run-away condition can be identified from the combined temperature data when a portion of the combined temperature data exceeds a threshold intensity, or exceeds intensities of adjacent temperature data.

In some specific embodiments, the infrared sensors 425 can take the form of low resolution infrared cameras that produce highly pixelated infrared images or heat maps. Suitable infrared cameras or commercially available for applications such as presence sensors for lighting applications or wildlife cameras, or other similar applications. These infrared sensors 425 may generate a pixelated image with a resolution as low as about eight pixels by eight pixels. The temperature data generated by the infrared sensors 425 can be can combined to form a combined image file by knitting the low resolution images generated by the sensors, and processing the combined image file to identify pixels having a high intensity indicative of thermal run-away, or to identify pixels having intensities that are outliers with respect to adjacent pixels from other temperature data. These techniques can avoid generating false positives, as the temperature of the battery cells 421 can vary depending on the load on the battery pack 420, the ambient temperature, air flow within the battery pack 420, or potentially many other parameters.

Whether the infrared sensors 425 each connect individually with the battery controller 427, or whether the infrared sensors connect to a common processor along a common bus 426, the use of infrared sensors to monitor entire rows of battery cells 421 without requiring individual instrumentation on the battery cells presents substantial advantages and cost savings. Due to thermal management constraints, individually instrumenting all of the battery cells 421 is infeasible, as the circuitry required to do so would inhibit the free flow of air within the enclosure 423. This approach would also significantly increase the complexity of the battery controller 427, as it would be required to accept sensor wires from a prohibitively large number of temperature sensors. The alternative approach, e.g. instrumenting the enclosure 423 with spaced sensors, faces the technical challenge that detection of thermal run-away events is significantly slowed by lack of direct contact with the overheating battery cell 422. In contrast, the infrared sensor-based approaches described herein provide for direct and immediate monitoring of all or substantially all of the battery cells 421 in the battery pack 420, minimize instrumentation or clutter within the enclosure 423, and provide several options for deficient wiring to the battery controller and for monitoring the received temperature data, as described above.

Figure 5:
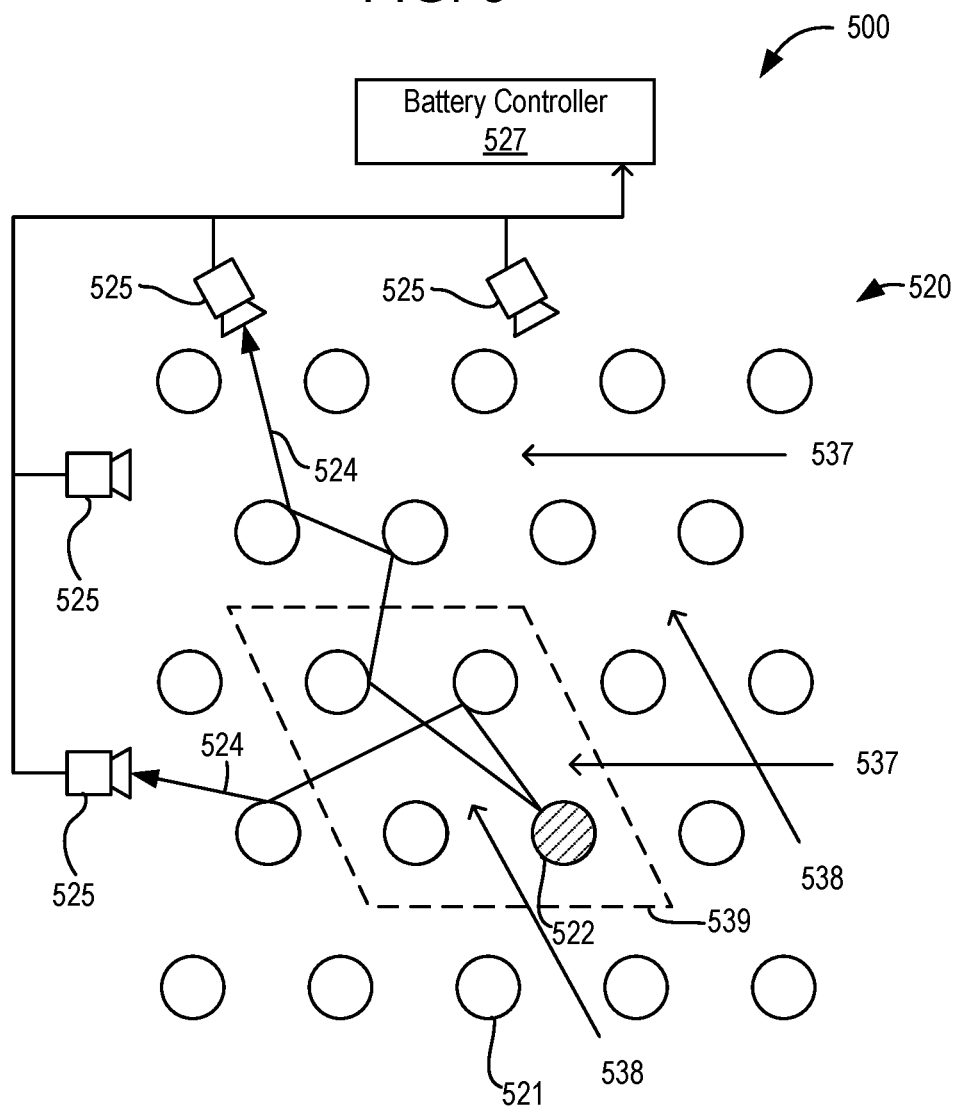
FIG. 5 illustrates a second example of a battery control system for detecting thermal run-away the battery pack using infrared sensors arranged in multiple directions, in accordance with embodiments.

FIG. 5 illustrates a second example of a battery control system 500 for detecting thermal run-away using infrared sensors arranged in multiple directions, in accordance with embodiments. The battery control system 500 includes a battery pack 520 shown in a top-down section view and omitting the enclosure. A network of infrared sensors 525 or positions pointing into the battery pack 520 along conduits 537, 538, between adjacent rows of battery cells 521. Conduits 537 and 538 intersect, and the use of the infrared sensors 525 along intersecting conduits can be used to facilitate locating any battery cell undergoing a thermal run-away event.

According to various embodiments, the infrared sensors 525 can be electrically connected with the battery controller 527 for relaying temperature data of the battery cells 521 to the battery controller. As shown, an overheating battery cell 522 reflects infrared radiation 524 along both of the conduits 537, 538, that are adjacent to the overheating battery cell. (Note, the infrared radiation 524 will be transmitted in all directions, but the positioning of the battery cells 521 in orderly rows and columns will tend to cause the infrared radiation to travel farthest along the conduits 537, 538.) Infrared sensors 525 position at each and of both conduits 537, 538 will detect the infrared radiation 524 and relay the temperature data to the battery controller 527. Based on the related temperature data, the battery controller 527 can determine that a thermal run-away event is in progress, and can respond by instructing the battery pack 520 enter a powered down state.

The temperature data obtained from multiple infrared sensors 525 can be used to identify and approximate location 539 of the overheating battery cell 422. Using this temperature data, the battery controller 527 can selectively power down a subset of the battery cells 521 that includes the battery cells at the approximate location 539. According to some alternative embodiments, e.g. where infrared sensors 525 are positioned more frequently at each adjacent conduit 537, 538, the battery controller 527 can use temperature data from multiple infrared sensors 525 in order to positively identify the specific overheating battery cell 522, and either power down the battery pack 520, power down a subset of the battery cells that includes the overheating battery cell, or power down only the overheating battery cell. Powering down a battery cell 521 can also include disconnecting the battery cell from the array.

Figure 6:
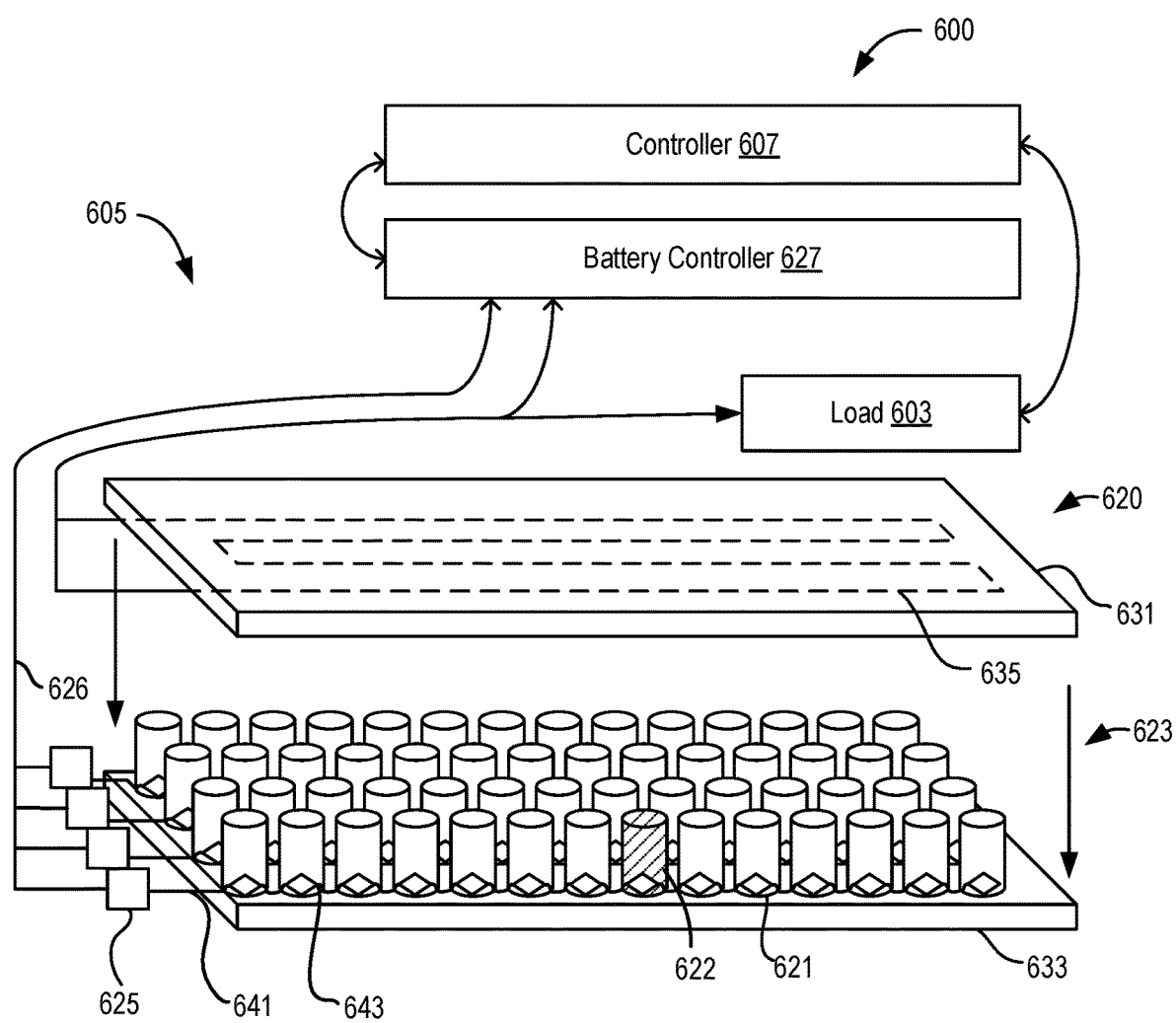
FIG. 6 illustrates an example battery control system for detecting thermal run-away in a battery pack using thermistor-based sensing circuits, in accordance with embodiments.

FIG. 6 illustrates an example battery control system 600 for detecting thermal run-away in a battery pack 620 using thermistor-based sensing circuits 641, in accordance with embodiments. The battery control system 600 includes a controller 607 that manages delivery of electrical power from a power supply 605 to a load 603. The load 603 can be any suitable loan described above, such as but not limited to a motor of an electric vehicle or hybrid electric vehicle, a UAV, any electrical system associated with an electrical vehicle, UAV, or any suitable stationary system that draws electrical power from a battery pack made up of an array of battery cells.

The battery pack 620 includes an array of battery cells 621 that are closely packed but spaced apart from each other to allow airflow between the battery cells for cooling, electrical isolation, and/or thermal isolation. The array of battery cells 621 can be packed according to a rectangular grid, according to a hexagonal or triangular grid, or according to any other suitable repeating arrangement. The battery cells 621 are secured within an enclosure 623 that includes at least a top enclosure element 631 and a bottom enclosure element 633 that are connected to the array of battery cells from above and below. The top enclosure element 631 and the bottom enclosure element 633 can include printed or attached circuitry 635 for electrically connecting the battery cells 621 together and with the battery controller 627 and the load 603. The circuitry 635 can take a variety of forms in order to create any suitable number of parallel subsets of battery cells within the battery pack 620, any suitable number of series subsets of battery cells within the battery pack, or any suitable combination in order to produce a battery pack that has an appropriate voltage and capacity.

The power supply 605 includes a battery pack 620 managed by the controller 607 and/or a local battery controller 627. The battery controller 627 can be a PCB that can monitor electrical characteristics of the battery pack 620, including but not limited to power output from the battery pack, voltages or currents across the battery pack, voltages or currents across the battery cells 621, or other parameters. According to various embodiments, the battery controller 627 can also monitor temperatures within the battery pack 620 in order to rapidly identify temperatures that exceed operational parameters of the individual battery cells 621. For example, according to various embodiments, the battery controller 627 is connected with a set of temperature sensing circuit controllers 625, each one electrically connected to a sensing circuit 641 that extends into the enclosure 623 and is connected with a subset of the array of battery cells 621. Each one of the sensing circuits 641 includes a series of thermistor containing nodes 643 that can attach to the battery cells 621. According to various embodiments, each sensing circuit 641 can connect to anywhere from one battery cell 621, to 10 battery cells, to 50 battery cells, or to more than 50 battery cells. According to some embodiments, each sensing circuit controller 625 can attach to one of the sensing circuits 641, and can relate temperature data from the sensing circuit to the battery controller 627.

The temperature data obtained via the sensing circuits 641 is based on the temperature/resistance curve of the thermistor containing nodes 643, each one of which contains a thermistor that changes in electrical conductivity depending on the temperature of the battery cell 621 to which the thermistor containing note is attached. According to some embodiments, the thermistors can increase in conductivity with temperature, thus decreasing an overall resistance of the sensing circuit 641 in response to a thermal run-away events, e.g., at overheating battery cell 622. The opposite approach can also be used, with thermistors that decrease in conductivity with temperature, such that an overall resistance of the sensing circuit 641 in response to thermal run-away is decreasing. In order to identify a thermal run-away event, the battery controller 627 can compare an electrical parameter of the sensing circuits 641, such as voltage, current, or resistance, with a threshold value associated with the presence of a high-temperature that exceeds the operating parameters of one of the battery cells 621. Alternatively, the sensing circuit controllers 625 can convert the raw signals received by the sensing circuits 641 and translate the signals into temperature data indicative of an average temperature of the subset of battery cells 621 to which the sensing circuit 641 is attached. The battery controller 627 can then compare the processed temperature data with a threshold temperature in order to determine whether a thermal run-away event has occurred.

A wide variety of specific configurations of the sensing circuits 641 and sensing circuit controllers 625 can be used without deviating from the principles described herein. For example, FIG. 6 shows linear arrangements of the sensing circuits 641 along parallel rows of battery cells 621, however, sensing circuits can be routed through the enclosure 623 according to any suitable geometry, as needed to most efficiently contact each one of the battery cells. The sensing circuits 641 can be routed through the open space within the enclosure 623, or alternatively, the sensing circuits can be adhered to, embedded in, or even printed on one of the top enclosure element 631, the bottom enclosure element 633, or both. The thermistor nodes 643 are shown attached along the sides of the battery cells 621, however, they can be attached at either end of the battery cells as well. As with the infrared sensor embodiments described above, the sensing circuit controllers 625 can each connect directly with the battery controller 627, or the thermistor circuit controllers can connect with the battery controller 627 via a common bus 626. According to some alternative embodiments, a single sensing circuit 641 can loop to connect with all of the battery cells 621. According to some further alternative embodiments, the sensing circuits 641 can connect directly with the battery controller 627 without passing through any intervening sensing circuit controller 625.

The use of thermistor based sensing circuits to monitor groups of battery cells 621 without requiring individual monitoring leads from each one of the battery cells presents substantial advantages and cost savings comparable to those achieved using the infrared sensor embodiments described above. The chained approach of attaching a series of thermistor nodes 643 to the battery cells 621 requires far fewer circuits to be added within the enclosure 623 than other approaches to individually instrumenting the battery cells, and the sensing circuits 641 can be attached or embedded in either the top enclosure element 631 or the bottom enclosure element 633 to provide for minimal impact on airflow. In addition, the thermistor based approaches described herein provide for immediate monitoring of the battery cells 621, while also minimizing excess wiring and data processing requirements. Data processing requirements can be further reduced by implementing thermistor based sensing circuits as a mesh that connects to all of the battery cells through one controller, as described below with reference to FIG. 7.

Figure 7:
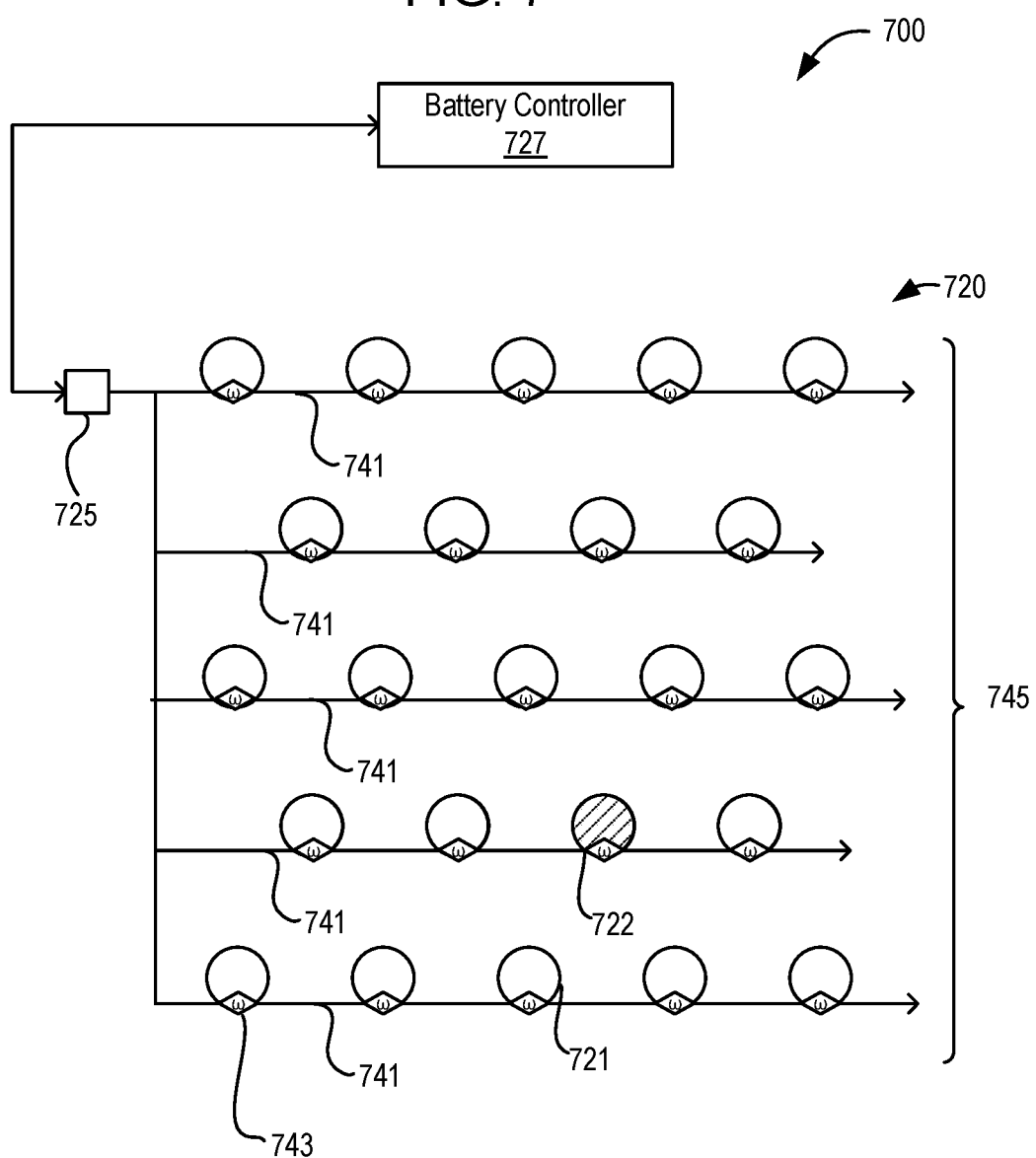
FIG. 7 illustrates a second example of a battery control system for detecting thermal run-away in a battery pack using a thermistor based sensing mesh, in accordance with embodiments.

FIG. 7 illustrates a second example of a battery control system 700 for detecting thermal run-away using a thermistor based sensing mesh 745, in accordance with embodiments. The battery control system 700 includes a battery pack 720 shown in a top-down section view and omitting the enclosure. According to various embodiments, a thermistor based temperature sensing mesh 745 is connected with the battery cells 721 of the battery pack 720. The temperature sensing mesh 745 is made up of multiple sensing circuits 741 that connects with groups of the battery cells 721 similar to the sensing circuits 641 described above (FIG. 6). Each one of the sensing circuits 641 is connected in parallel, and connected with the battery controller 727, optionally via a local sensing circuit controller 725. The sensing circuits 741 include an arrangement of chained thermistor containing nodes 743, the nodes being connected with the battery cells 721. A rise in temperature of any one of the battery cells 721, e.g. overheating battery cells 722, triggers a change in the conductivity of the thermistor containing node 743 attached to the battery cell. This change in conductivity can be sensed by the sensing circuit controller 725 or by the battery controller 727, and indicates a thermal run-away event.

Sensing circuits 641, 741 described above with reference to FIGS. 6 and 7 can take a wide variety of forms, with advantages specific to each form of sensing circuit. A nonlimiting selection of example sensing circuits are described below with reference to FIGS. 8-11. It will be understood that the battery control systems 600, 700, and other battery control systems described herein, can make use of variations on the sensing circuits described herein, combinations of the sensing circuits described herein, or alternative sensing circuits based on the same principles.

Figure 8:
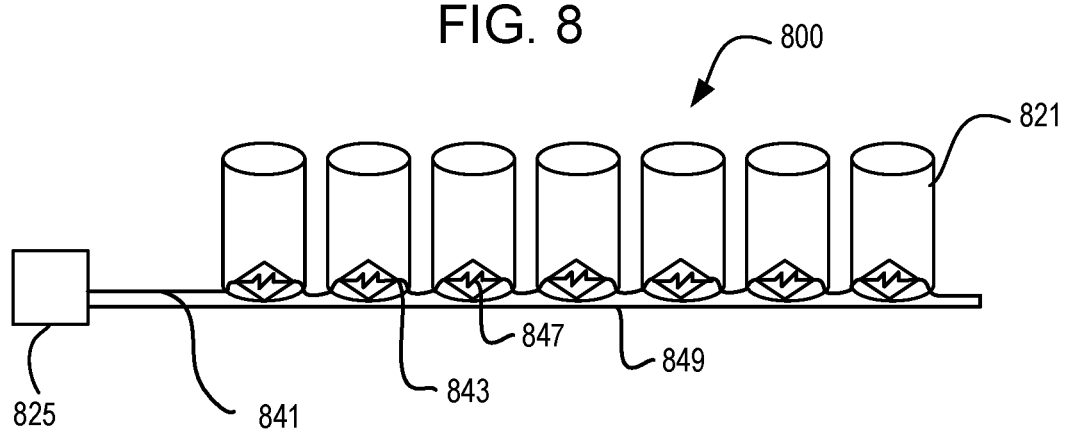
FIG. 8 illustrates a first example of a thermistor based sensing circuit having thermistors arranged in series, in accordance with embodiments.

FIG. 8 illustrates a first example sensing system 800 including a thermistor based sensing circuit 841 having thermistors 847 arranged in series, in accordance with embodiments. The sensing circuit 841 includes a series of nodes 843 attached to battery cells 821, where each node is a thermistor 847 that is thermally coupled with a corresponding battery cell. The sensing circuit 941 can be connected via a return or ground 849 to the sensing circuit controller 825. A total resistance of the sensing circuit 841 will be a function of the collective resistance of the thermistors 847. This sensing circuit 841 having thermistors in series minimizes wiring and components, however it can be limited in sensitivity due to the increasing collective resistance of the sensing circuit as the number of thermistors 847 increases. These limitations can be mitigated by utilizing nonlinear thermistors (i.e., thermistors having a nonlinear resistance/temperature curve). Normal variation in temperatures in a battery pack that is underload can vary from about 30° C. to about 40° C. Temperatures indicative of thermal run-away conditions can quickly reach 100° C., or several hundred degrees C., at the individual battery cell undergoing thermal run-away. Therefore, the impact on a cumulative resistance of a series circuit of thermistors by thermal run-away conditions is sufficiently high that a large number of thermistors 847, e.g., more than 10 thermistors, or more than 50 thermistors, or from 10 to 50 thermistors, can be used in series in an effective sensing circuit 841.

Figure 9:
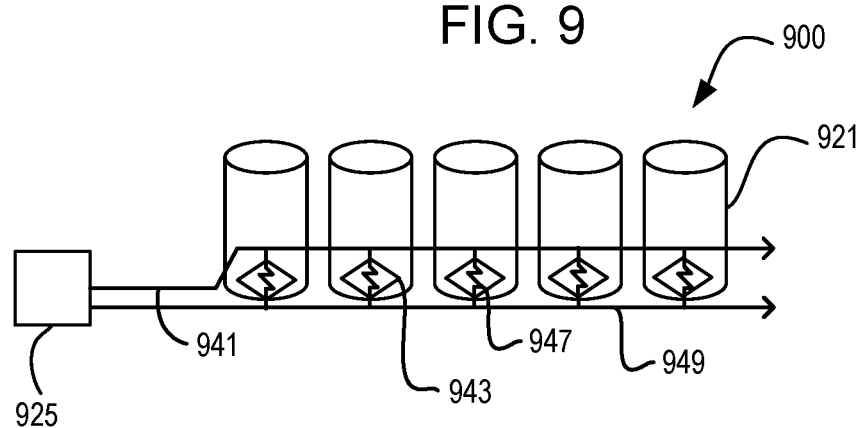
FIG. 9 illustrates a second example of a thermistor based sensing circuit having thermistors arranged in parallel, in accordance with embodiments.

FIG. 9 illustrates a second example sensing system 900 including a thermistor based sensing circuit 941 having thermistors 947 arranged in parallel, in accordance with embodiments. The sensing circuit 941 includes a series of nodes 943 attached to battery cells 921, where each node is a thermistor 947 that is thermally coupled with a corresponding battery cell. The sensing circuit 941 can be connected via a return or ground 949 to the sensing circuit controller 925. The return or ground 949 must parallel the main line of the sensing circuit 941, thus, this embodiment does require additional room for routing. A total resistance of the sensing circuit 941 is now effectively decoupled from the length of the sensing circuit, however the sensing circuit may be more sensitive to minor fluctuations in temperature that affect multiple battery cells 921. These limitations can be mitigated by utilizing nonlinear thermistors (i.e., thermistors having a nonlinear resistance/temperature curve), particularly by utilizing thermistors that have low responsiveness within a temperature range at which the system ordinarily operates, and a nonlinear response above the normal temperature range.

In either a series or in a parallel circuit, the number of thermistors that can be used depends on the tolerances of the thermistor circuit and the sensitivity of the sensing circuit. According to various embodiments, a thermistor-based sensing circuit can detect an anomalous temperature increase of 10° C. in a thermistor circuit having up to 100 thermistor elements in series or in parallel, corresponding to a 1 mV sensitivity of the sensing circuit. However, preconditions for a thermal run-away event can include sudden temperature spikes of individual battery cells of more than 100° C. According to other embodiments, a thermistor based sensing circuit can detect an anomalous temperature increase of 100° C. in a thermistor circuit having up to 200 thermistor elements arranged in series or in parallel. Various embodiments of thermistor based sensing circuits can employ up to 200 thermistor elements arranged in series or parallel, up to 100 thermistor elements arranged in series or parallel, or up to 10 thermistor elements arranged in series or in parallel.

Figure 10:
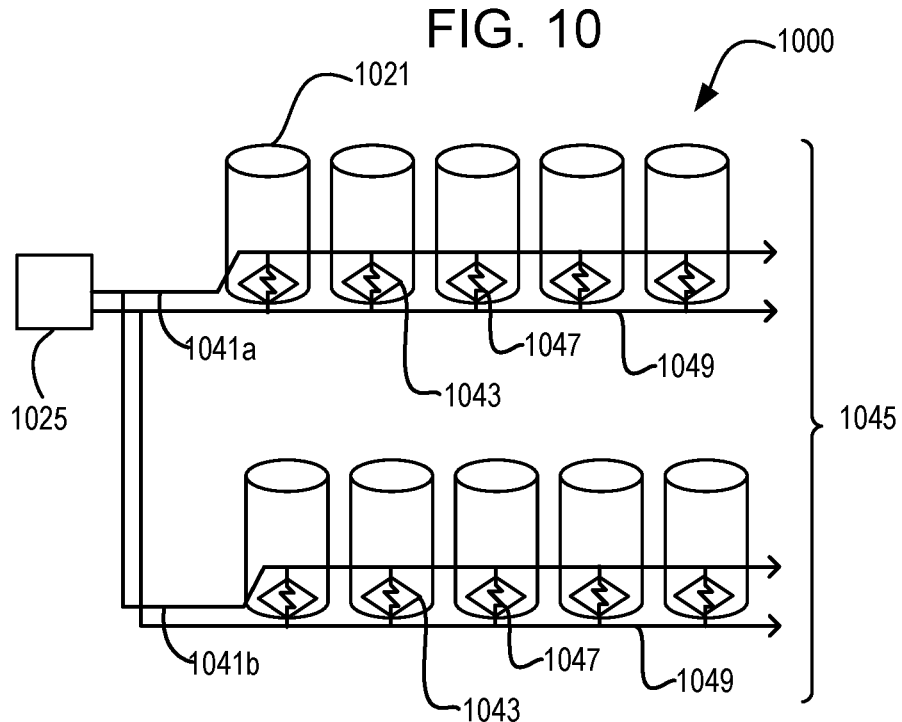
FIG. 10 illustrates an example of a thermistor based sensing mesh, in accordance with embodiments.

FIG. 10 illustrates an example of a thermistor based sensing system 1000 that includes a temperature sensing mesh 1045, in accordance with embodiments. The sensing mesh 1045 includes a first sensing circuit 1041a and a second sensing circuit 1041b, and may further include any suitable number of additional sensing circuits connected in parallel with each other. Each sensing circuit 1041 includes a series of nodes 1043 attached to battery cells 1021, where each node is a thermistor 1047 that is thermally coupled with a corresponding battery cell. The sensing circuits 1041 as shown include thermistors 1047 in parallel arrangements.

Figure 11:
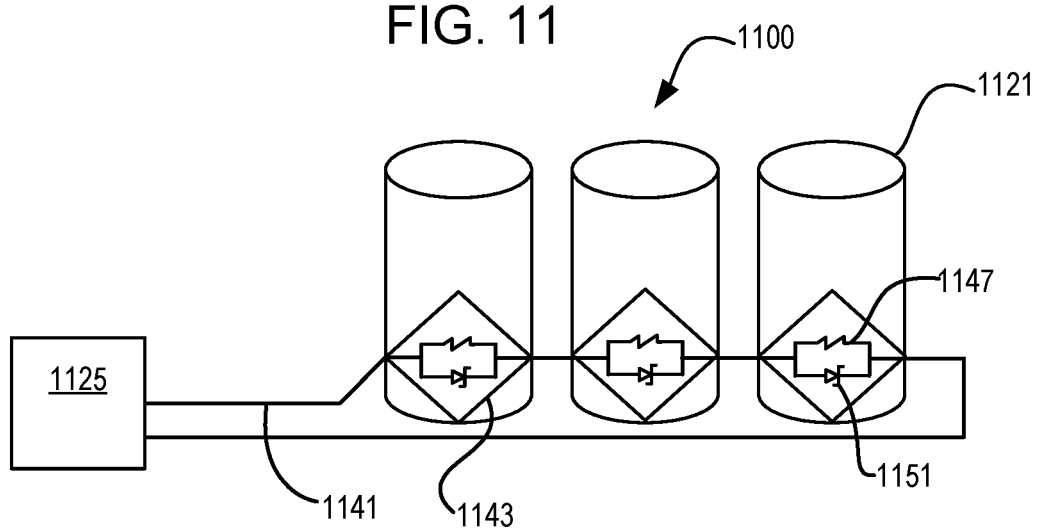
FIG. 11 illustrates an example of a thermistor based sensing circuit having sensing nodes that include thermistors in parallel with nonlinear diodes, in accordance with embodiments.

The sensitivity and reliability of the thermistor based sensing systems described herein can be enhanced by utilizing nonlinear diodes in combination with thermistors attached to the battery cells. For example, FIG. 11 illustrates an example of a thermistor based sensing system 1100 that includes a sensing circuit 1141 having sensing nodes 1143 that include thermistors 1147 in parallel with nonlinear diodes 1151, in accordance with embodiments. Each sensing node 1143 includes a parallel arrangement of a thermistor 1147 and nonlinear diodes 1151, e.g., Zener diode or comparable, that exhibits nonlinear behavior in response to a change in voltage or current. In operation, when one of the battery cells 1121 undergoes a thermal run-away events, the associated thermistor 1147 attached to that battery cell will change in conductivity. In response, a voltage across the sensing node 1143 will change, prompting breakdown of the nonlinear diode 1151, and an abrupt change in behavior of the diode. For Zener diodes, passing the breakdown voltage causes the diode to allow current to flow in reverse, which is detectable by the sensing circuit controller 1125.

FIGS. 12-18 illustrate various example processes for managing electrical devices that include battery packs with array battery cells, including processes for detecting thermal run-away events. Some or all of the processes 1200-1800 (or any other processes described herein, or variations, and/or combinations thereof) may also be performed under the control of one or more computer systems configured with executable instructions and may be implemented as code (e.g., executable instructions, one or more computer programs, or one or more applications) executing collectively on one or more processors, by hardware or combinations thereof. Aspects of the processes 1200-1800 may be performed, in embodiments, by a system similar to the systems 100, 200, or 300 shown in FIGS. 1-3. The system may be implemented in an electric vehicle, such as an unmanned electric vehicle (UAV), an electric automobile, hybrid electric automobile, and electric or hybrid electric train, ship, or any other suitable electric vehicle that utilizes a power supply including a battery pack with arrayed battery cells. The code may be stored on a computer-readable storage medium, for example, in the form of a computer program comprising a plurality of instructions executable by one or more processors. The computer-readable storage medium may be non-transitory.

Figure 12:
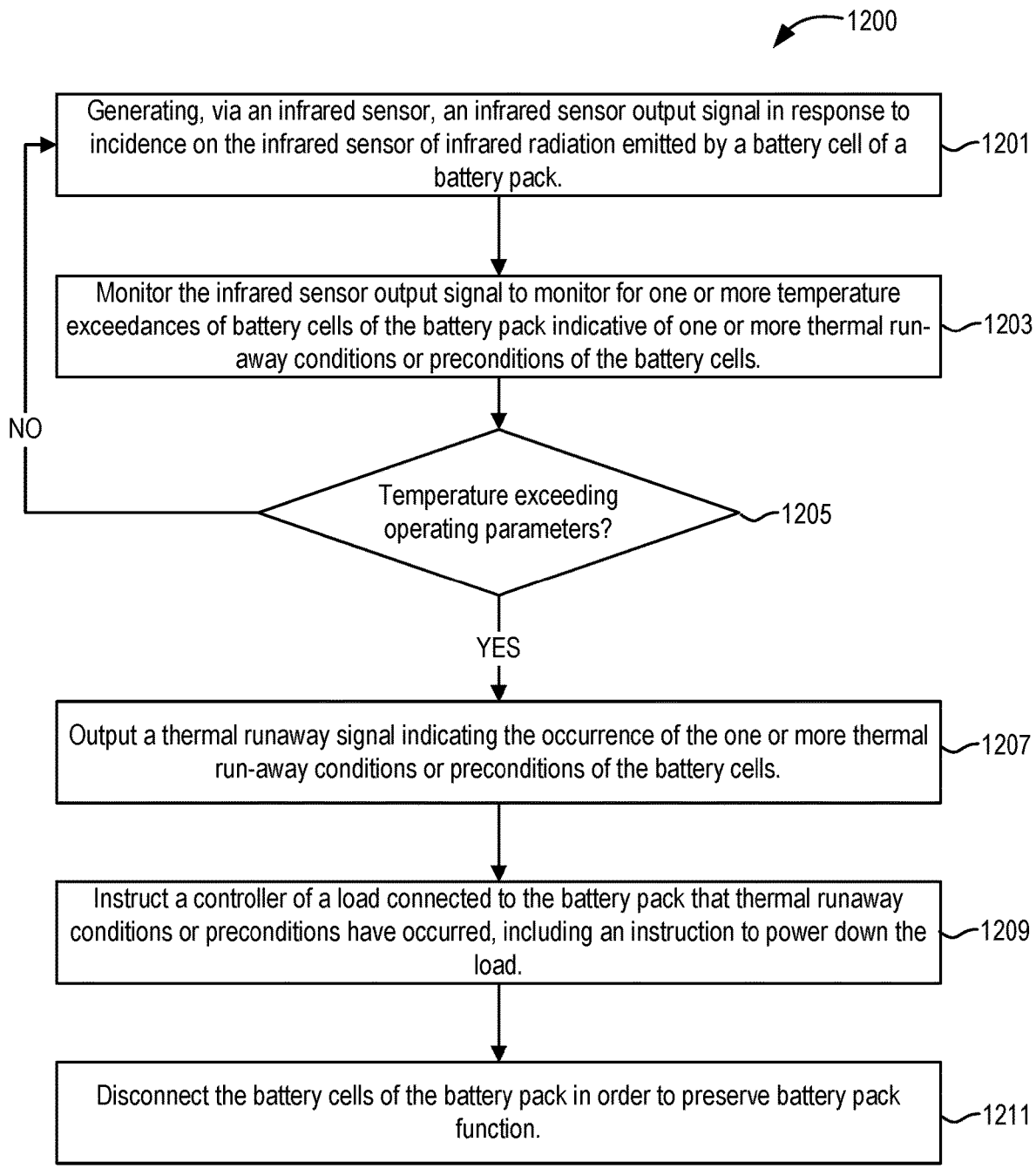
FIG. 12 is a process flow diagram illustrating a method of sensing thermal run-away in a battery pack using an infrared sensor, in accordance with embodiments.

FIG. 12 is a process flow diagram 1200 illustrating a method of sensing thermal run-away in a battery pack using an infrared sensor, in accordance with embodiments. In an embodiment, the process 1200 includes generating, via an infrared sensor, an infrared sensor output signal in response to incidence on the infrared sensor of infrared radiation emitted by a battery cell of the battery pack. (Act 1201). The system can monitor, via a controller, the infrared sensor output signal to monitor for one or more temperature exceedances of battery cells of the battery pack indicative of one or more thermal run-away conditions of the battery cells. (Act 1203). Monitoring the battery cells can, in some embodiments, detect preconditions to a thermal run-away event, e.g., elevated temperatures that precede thermal run-away or that indicate an elevated risk of thermal run-away occurring, before irreversible damage to the battery cells has occurred or before actual thermal run-away conditions have occurred. If none of the temperature data indicate temperatures exceeding the operating conditions of the battery cells, the system can iteratively monitor the temperature data. (Act 1205). In response to the infrared sensor output signal being indicative of one or more thermal run-away conditions of the battery cells, output a thermal run-away signal indicating the occurrence of the one or more thermal run-away conditions of the battery cells. (Act 1207).

According to some embodiments, in addition to outputting a thermal run-away signal, the system can further instruct a controller of a load connected to the battery pack that thermal run-away conditions have occurred, including an instruction to power down the load. (Act 1209). In addition, or alternatively, the system can disconnect the battery cells of the battery pack in order to preserve battery pack function. (Act 1211).

Figure 13:
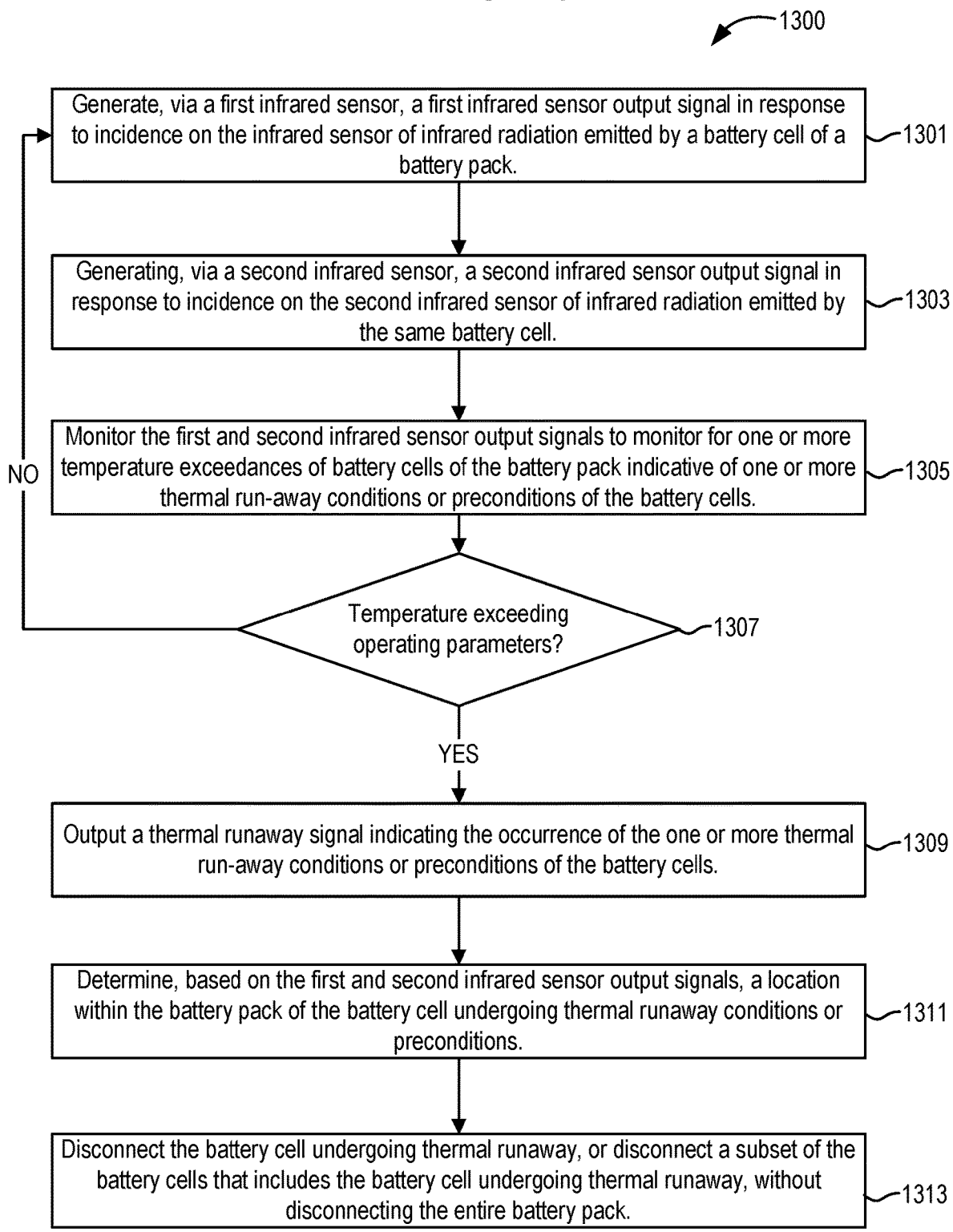
FIG. 13 is a process flow diagram illustrating a method of sensing and locating thermal run-away in a battery pack using infrared sensors, in accordance with embodiments.

FIG. 13 is a process flow diagram 1300 illustrating a method of sensing and locating thermal run-away in a battery pack using infrared sensors, in accordance with embodiments. In an embodiment, the process 1300 includes generating, via a first infrared sensor, a first infrared sensor output signal in response to incidence on the infrared sensor of infrared radiation emitted by a battery cell of the battery pack. (Act 1301). The process 1300 further includes generating, via a second infrared sensor, a second infrared sensor output signal in response to incidence on the second infrared sensor of infrared radiation emitted by the same battery cell. (Act 1303). The system can monitor, via a controller, the first and second infrared sensor output signals to monitor for one or more temperature exceedances of battery cells of the battery pack indicative of one or more thermal run-away conditions of the battery cells. (Act 1305). Monitoring the battery cells can, in some embodiments, detect preconditions to a thermal run-away event, e.g., elevated temperatures that precede thermal run-away or that indicate an elevated risk of thermal run-away occurring, before irreversible damage to the battery cells has occurred or before actual thermal run-away conditions have occurred.

If none of the temperature data indicate temperatures exceeding the operating conditions of the battery cells, the system can iteratively monitor the temperature data. (Act 1307). In response to either the first infrared sensor output signal or the second infrared sensor output signal being indicative of one or more thermal run-away conditions of the battery cells, the system can output a thermal run-away signal indicating the occurrence of the one or more thermal run-away conditions of the battery cells. (Act 1309). The system can further determine, based on the first infrared sensor and the second infrared sensor associated with the first and second infrared sensor output signals, a location within the battery pack of the battery cell undergoing thermal run-away conditions. (Act 1311). In response to determining the location of the battery cell undergoing thermal run-away conditions, the system can disconnect the battery cell undergoing thermal run-away, or can disconnect a subset of the battery cells undergoing thermal run-away, without disconnecting the entire battery pack. (Act 1313).

Figure 14:
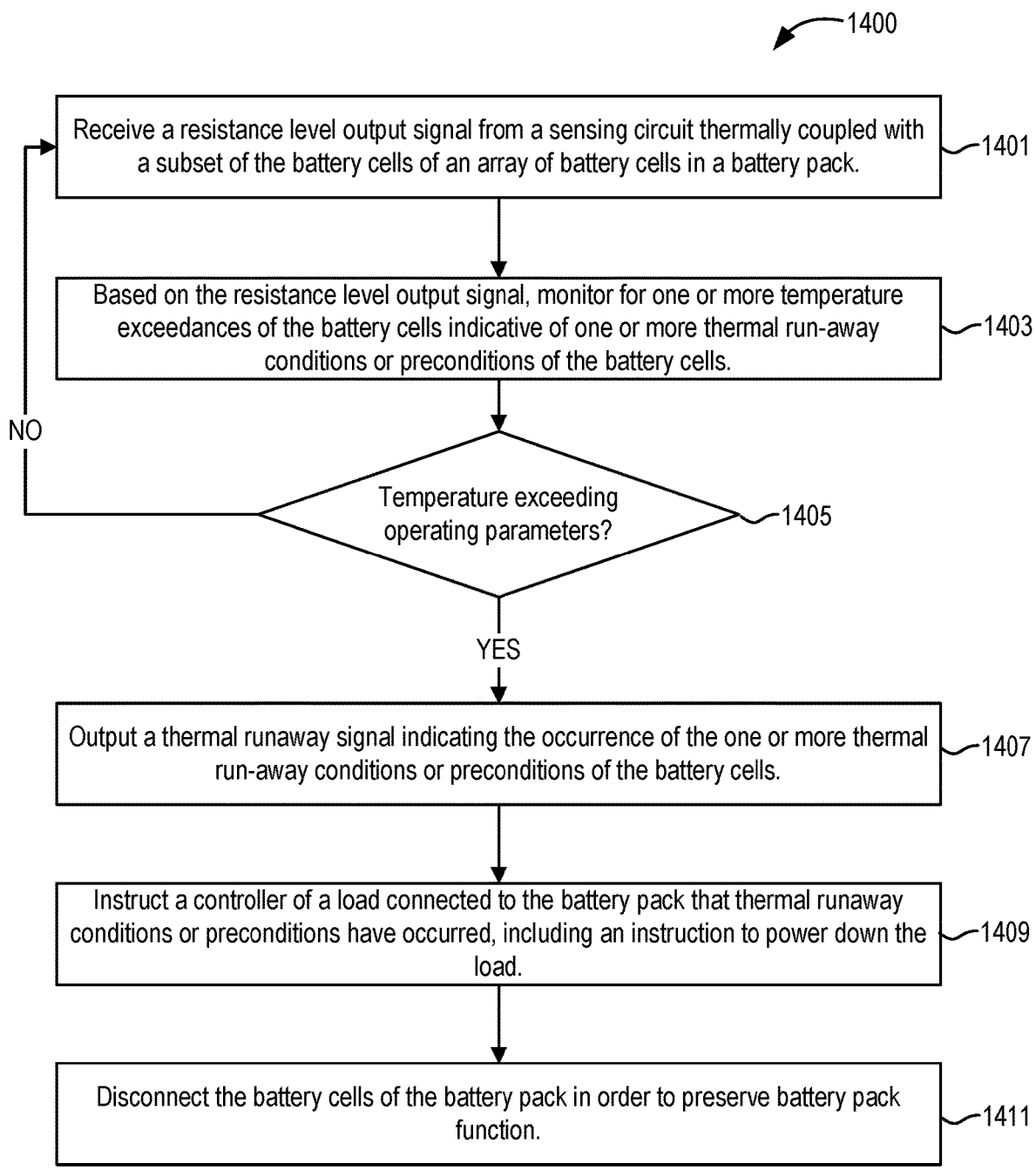
FIG. 14 is a process flow diagram illustrating a method of sensing thermal run-away in a battery pack using a thermistor based sensing circuit, in accordance with embodiments.

FIG. 14 is a process flow diagram 1400 illustrating a method of sensing thermal run-away in a battery pack using a thermistor based sensing circuit, in accordance with embodiments. In an embodiment, the process 1400 includes receiving a resistance level output signal from a sensing circuit thermally coupled with a subset of the battery cells of an array of battery cells in a battery pack. (Act 1401). Based on the resistance level output signal, the system can monitor for one or more temperature exceedances of the battery cells indicative of one or more thermal run-away conditions of the battery cells. (Act 1403). Monitoring the battery cells can, in some embodiments, detect preconditions to a thermal run-away event, e.g., elevated temperatures that precede thermal run-away or that indicate an elevated risk of thermal run-away occurring, before irreversible damage to the battery cells has occurred or before actual thermal run-away conditions have occurred. If none of the temperature data indicate temperatures exceeding the operating conditions of the battery cells, the system can iteratively monitor the resistance level output signal. (Act 1305).

In response to the resistance level output signal being indicative of one or more thermal run-away conditions of the battery cells, the system can output a thermal run-away signal indicating the occurrence of the one or more thermal run-away conditions of the battery cells.

(Act 1307). According to some embodiments, in addition to outputting a thermal run-away signal, the system can further instruct a controller of a load connected to the battery pack that thermal run-away conditions have occurred, including an instruction to power down the load. (Act 1309).

In addition, or alternatively, the system can disconnect the battery cells of the battery pack in order to preserve battery pack function. (Act 1311).

Figure 15:
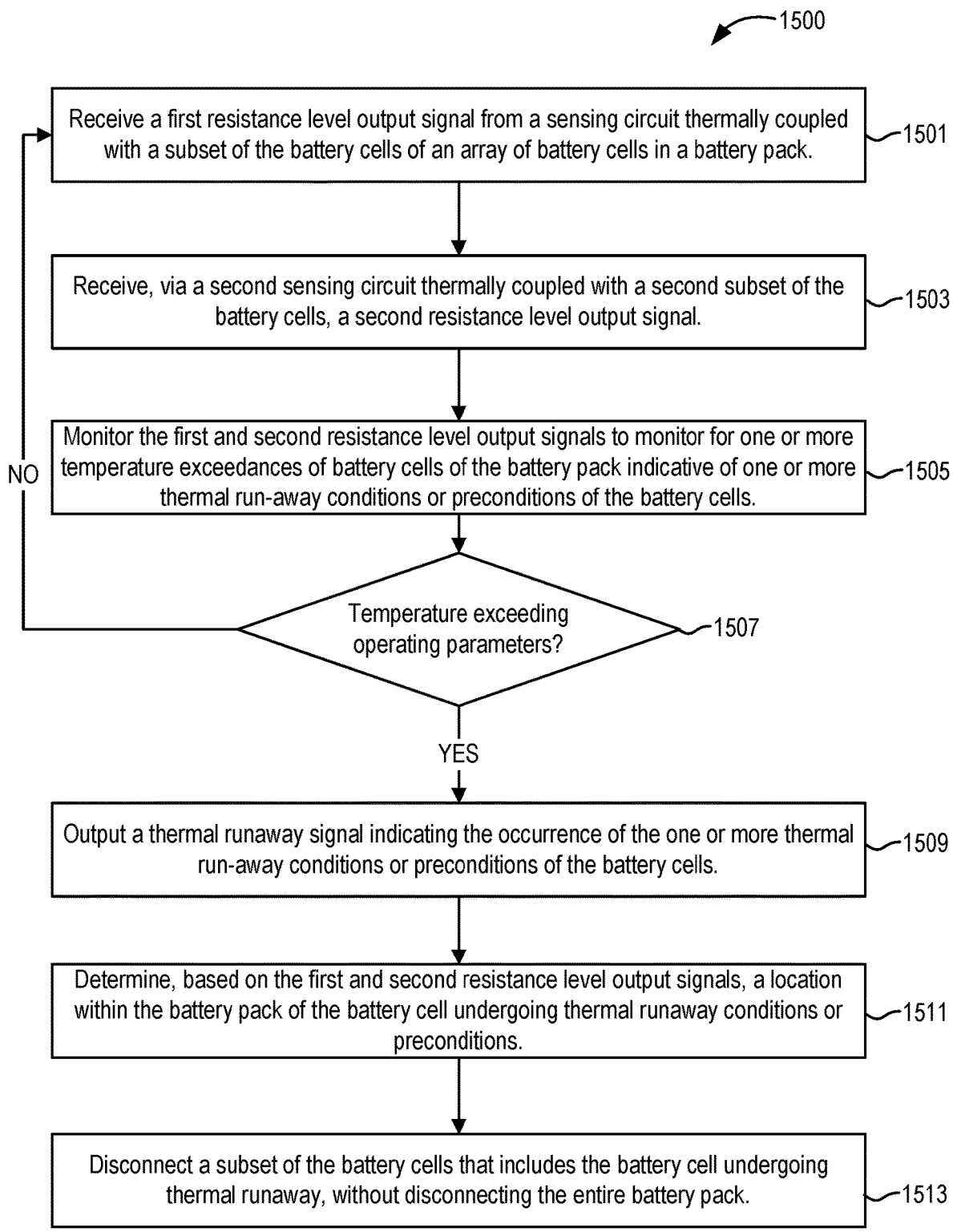
FIG. 15 is a process flow diagram illustrating a method of sensing and locating thermal run-away in a battery pack using thermistor based sensing circuits, in accordance with embodiments.

FIG. 15 is a process flow diagram 1500 illustrating a method of sensing and locating thermal run-away in a battery pack using thermistor based sensing circuits, in accordance with embodiments. In an embodiment, the process 1500 includes receiving a resistance level output signal from a sensing circuit thermally coupled with a subset of the battery cells of an array of battery cells in a battery pack. (Act 1501). The process 1500 further includes receiving, via a second sensing circuit thermally coupled with a different subset of the battery cells, a second resistance level output signal. (Act 1503). The system can monitor, via a controller, the first and second resistance level output signals to monitor for one or more temperature exceedances of battery cells of the battery pack indicative of one or more thermal run-away conditions of the battery cells. (Act 1505). Monitoring the battery cells can, in some embodiments, detect preconditions to a thermal run-away event, e.g., elevated temperatures that precede thermal run-away or that indicate an elevated risk of thermal run-away occurring, before irreversible damage to the battery cells has occurred or before actual thermal run-away conditions have occurred.

If none of the temperature data indicate temperatures exceeding the operating conditions of the battery cells, the system can iteratively monitor the resistance level output signals. (Act 1507). In response to either the resistance level output signal or the second resistance level output signal being indicative of one or more thermal run-away conditions of the battery cells, the system can output a thermal run-away signal indicating the occurrence of the one or more thermal run-away conditions of the battery cells. (Act 1509). The system can further determine, based on the first and second resistance level output signals, a location within the battery pack of the battery cell undergoing thermal run-away conditions, e.g., whether the battery pack undergoing thermal runway conditions is in a first subset of the battery cells or in the second subset of the battery cells. (Act 1511). In response to determining the location of the battery cell undergoing thermal run-away conditions, the system can disconnect the subset of the battery cells containing the battery cell undergoing thermal run-away, without disconnecting the entire battery pack. (Act 1513).

Figure 16:
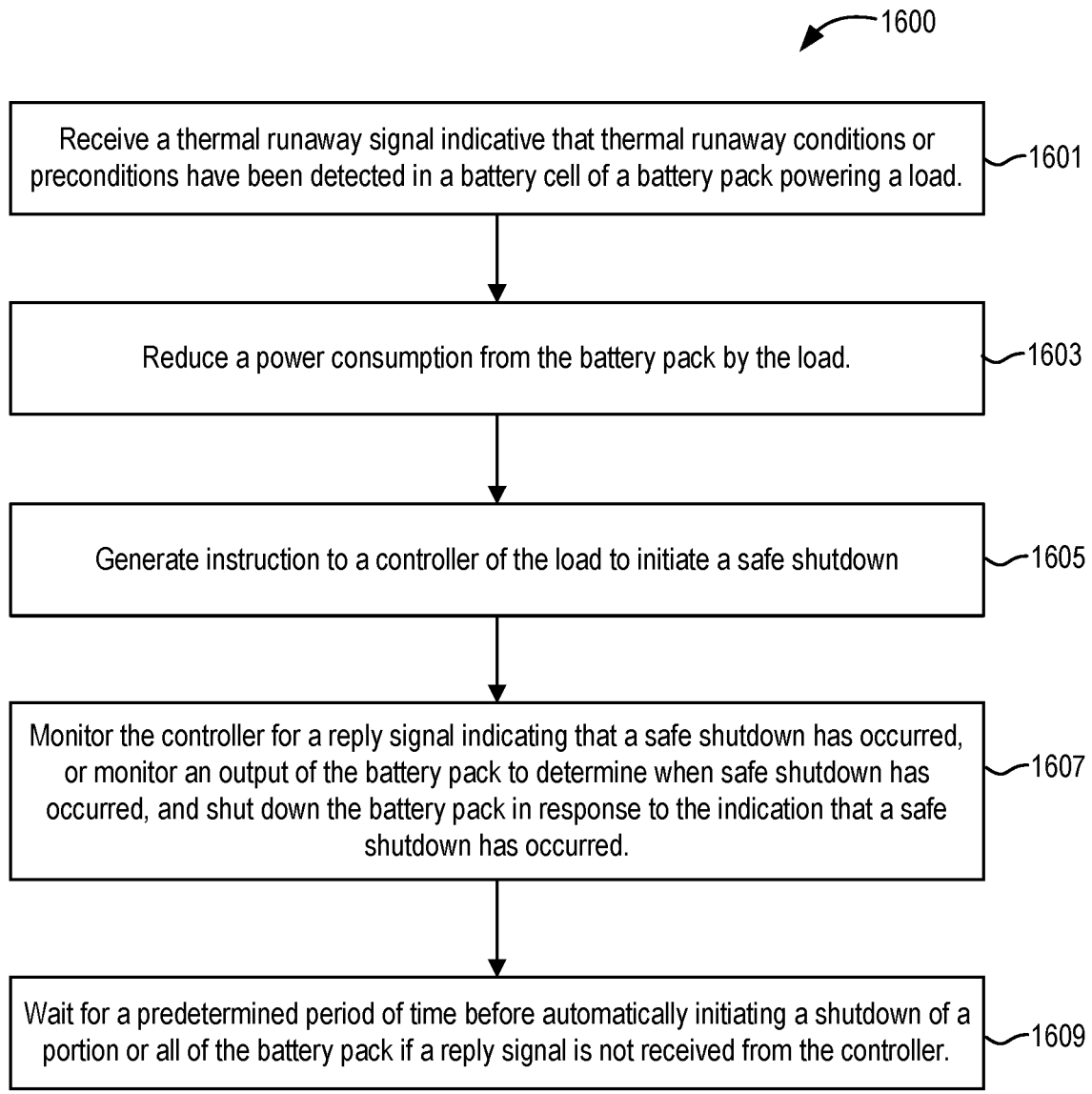
FIG. 16 is a process flow diagram illustrating a method of sensing thermal run-away in a battery pack and managing power output to a load, in accordance with embodiments.

FIG. 16 is a process flow diagram 1600 illustrating a method of sensing thermal run-away in a battery pack and managing power output to a load, in accordance with embodiments. In an embodiment, the process 1600 includes receiving a thermal run-away signal indicative that thermal run-away conditions or preconditions have been detected in a battery cell of a battery pack powering the load. (Act 1601). According to some embodiments, the thermal run-away signal can be generated when a temperature in a battery cell of the battery pack exceeds a threshold temperature, but before thermal run-away conditions are inevitable, thus permitting the system to prevent or mitigate thermal run-away before the battery pack is damaged. According to various other embodiments, the threshold can be set to detect excess heat generated by a battery cell before thermal run-away conditions have been met, when thermal run-away conditions are just beginning and still recoverable, or after a thermal run-away event has occurred. In response to receiving the thermal run-away signal, the system can reduce a power draw from the battery pack. (Act 1603). Reducing the power draw can include, according to various embodiments: imposing a limit in the power draw by a battery controller, instructing a controller of the load associated with the battery pack to limit demand for power, or selectively disconnecting an affected battery cell or a subset of the battery cells in order to mitigate or reverse the thermal run-away event. The system can generate instruction to a controller of the load, e.g. a controller of an electric vehicle, UAV, or other electronic device drawing power from the battery pack, to initiate a safe shutdown. (Act 1605). According to some embodiments, the system can monitor the controller for a reply signal indicating that a safe shutdown has occurred, or can monitor an output of the battery pack to determine when safe shutdown has occurred, and can initiate a shutdown of a portion or of all of the battery pack in response. (Act 1607). Alternatively, or in parallel, the system can wait for a predetermined period of time before automatically initiating a shutdown of a portion or all of the battery pack if a reply signal is not received from the controller. (Act 1609).

Figure 17:
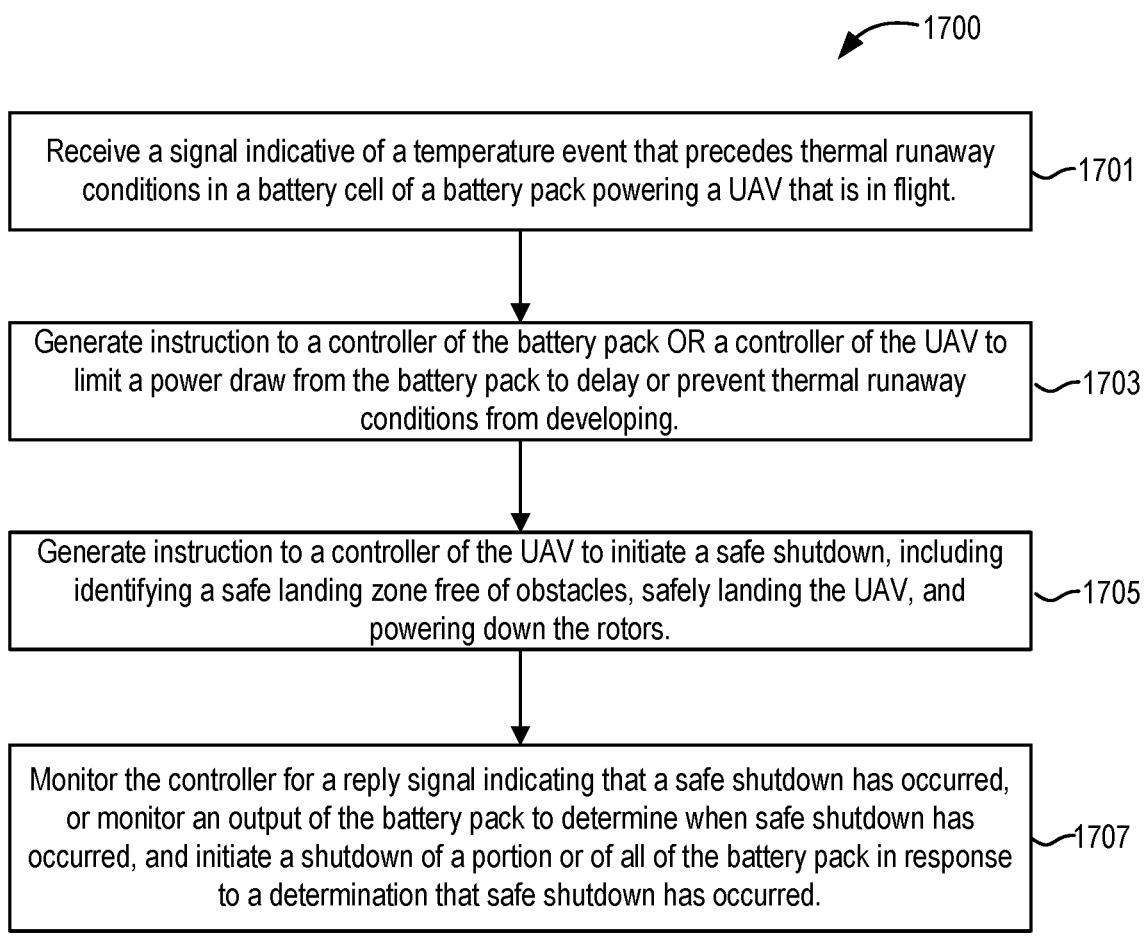
FIG. 17 is a process flow diagram illustrating a method of sensing thermal run-away in a battery pack and managing safe shutdown of a UAV, in accordance with embodiments.

FIG. 17 is a process flow diagram 1700 illustrating a method of sensing thermal run-away in a battery pack and managing safe shutdown of a UAV, in accordance with embodiments. In an embodiment, the process 1700 includes receiving a thermal run-away signal indicative of a temperature event that can precede thermal run-away conditions in the battery pack powering a UAV that is in flight. (Act 1701). The thermal run-away signal can be generated when a temperature in a battery cell of the battery pack exceeds a threshold temperature, and the threshold can be set to detect excess heat generated by a battery cell before thermal run-away conditions have been met, or when thermal run-away conditions are just beginning and still recoverable. In response to receiving the thermal run-away signal, the system can attempt to mitigate or prevent thermal run-away by limiting the power draw from the battery pack by the systems of the UAV (e.g., propulsive systems), either under the control of a battery pack controller which throttles the amount of power available to the UAV, or by the UAV controller. (Act 1703). The system can then generate instruction to a controller of the UAV drawing power from the battery pack to initiate a safe shutdown, including identifying a safe landing zone free of obstacles, safely landing the UAV, and powering down the rotors. (Act 1705). According to some embodiments, the system can monitor the controller for a reply signal indicating that a safe shutdown has occurred, or can monitor an output of the battery pack to determine when safe shutdown has occurred, and can initiate a shutdown of a portion or of all of the battery pack in response. (Act 1707). Although it is possible to also initiate an automatic shutdown of the battery pack in response to thermal run-away, in the context of a UAV, it is often preferable to continue seeking a safe landing zone before powering down the battery pack, even if doing so might damage the battery pack. However, the intervening step of reducing power draw from the UAV battery pack can, in some cases, reverse or slow the onset of thermal run-away conditions such that the UAV can safely land and subsequently disconnect the battery cells, thus halting or preventing thermal run-away.

Figure 18:
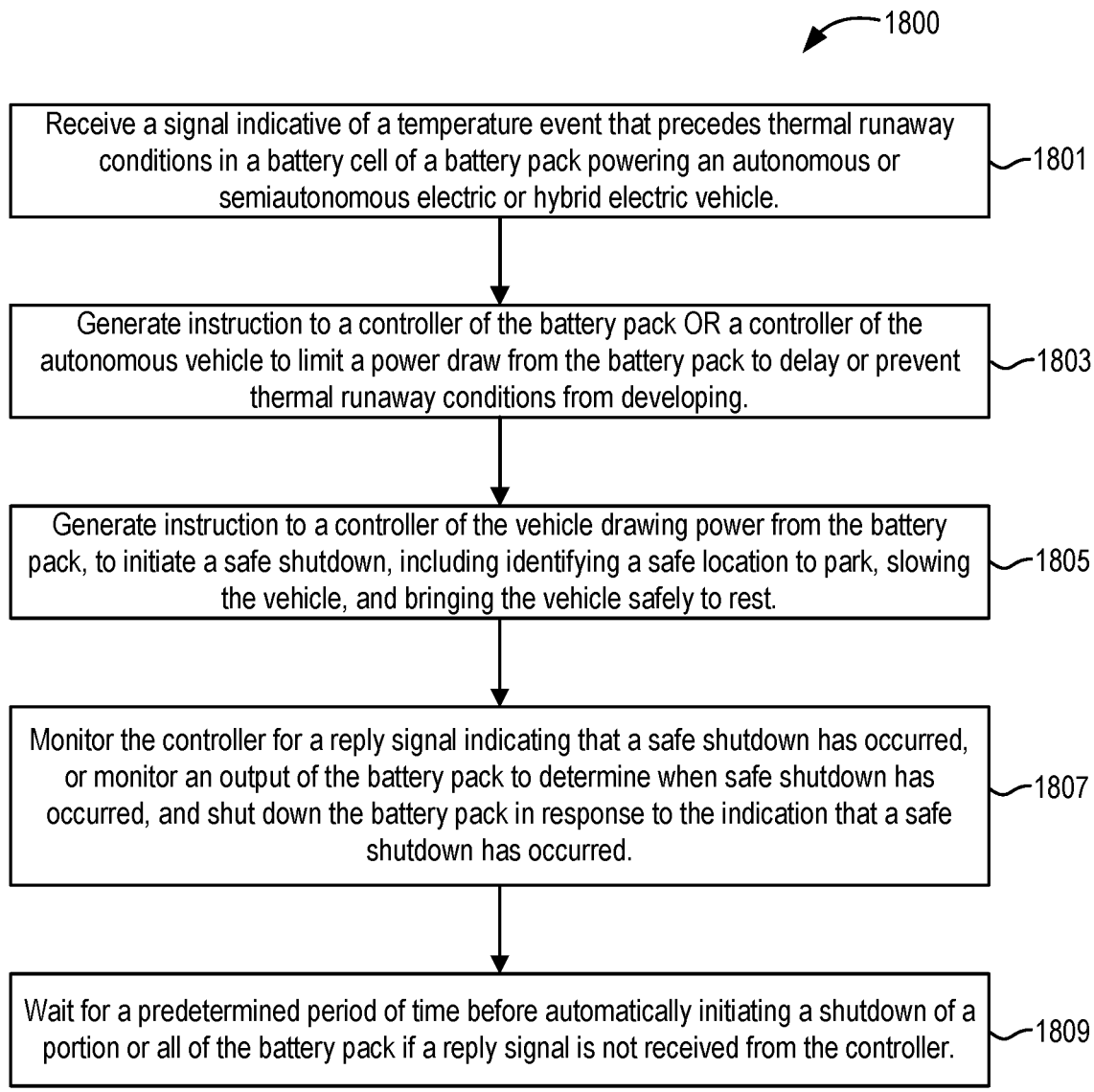
FIG. 18 is a process flow diagram illustrating a method of sensing thermal run-away in a battery pack and managing safe shutdown of an autonomous or semiautonomous vehicle, in accordance with embodiments.

FIG. 18 is a process flow diagram 1800 illustrating a method of sensing thermal run-away in a battery pack and managing safe shutdown of an autonomous or semiautonomous vehicle, in accordance with embodiments. In an embodiment, the process 1800 includes receiving a thermal run-away signal indicative of preconditions for a thermal run-away event, e.g., when a temperature in a battery cell of the battery pack exceeds a threshold temperature, for a battery pack powering an autonomous or semiautonomous electric or hybrid electric vehicle. (Act 1801). The threshold can be set to detect excess heat generated by a battery cell before thermal run-away conditions have been met, when thermal run-away conditions are just beginning and still recoverable, or when thermal run-away conditions are detected. As an initial response, the system can instruct either a controller of the battery pack, or a controller of the vehicle, to limit a power draw from the battery pack in order to delay or prevent a thermal run-away event from occurring. (Act 1803). This response can include, in some cases, limiting an amount of a power draw from the battery pack as a whole. In some other cases, the response can include disconnecting portions of the battery pack, e.g., a battery cell or a subset of the battery cells affected by the thermal run-away conditions. In response to receiving the thermal run-away signal, the system can also generate instructions for a controller of the vehicle drawing power from the battery pack to initiate a safe shutdown, including identifying a safe location to park, slowing the vehicle, and bringing the vehicle safely to rest. (Act 1805). According to some embodiments, the system can monitor the controller for a reply signal indicating that a safe shutdown has occurred, or can monitor and output of the battery pack to determine when safe shutdown has occurred, and can initiate a shutdown of a portion or of all of the battery pack in response. (Act 1807). Alternatively, or in parallel, the system can wait for a predetermined period of time before automatically initiating a shutdown of a portion or all of the battery pack if a reply signal is not received from the controller. (Act 1809).

The specification and drawings are to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A battery system, comprising:
   a battery pack comprising an array of battery cells;
   a load that is electrically connected with the battery pack and configured to draw power from the array battery cells;
   an infrared sensor configured to generate a first infrared sensor output signal in response to incidence on the infrared sensor of infrared radiation emitted by at least two of the battery cells; and
   a controller comprising at least one processor and a memory device containing executable instructions that, when executed by the at least one processor, cause the controller to:
   receive and monitor the infrared sensor output signal to monitor for one or more temperature exceedances of the battery cells indicative of one or more thermal run-away conditions of the battery cells; and
   in response to the infrared sensor output signal being indicative of one or more thermal run-away conditions of the battery cells, output a thermal run-away signal indicating the occurrence of the one or more thermal run-away conditions of the battery cells.

2. The system of claim 1, wherein:
   the load comprises one of: an electric motor for an unmanned aerial vehicle, an electric vehicle, or a hybrid vehicle; and
   generating the signal comprises generating a warning for presentation to a user indicative that the battery pack has entered thermal run-away.

3. The system of claim 1, wherein:
   the load comprises one of: an electric motor for an unmanned aerial vehicle, an electric vehicle, or a hybrid vehicle; and generating the signal comprises instructing the electric motor to reduce a power consumption or to halt a power consumption from the battery pack.

4. The system of claim 1, further comprising a second infrared sensor arranged to sense infrared radiation emitted or reflected by at least two of the battery cells, wherein the executable instructions, when executed by the at least one processor, further cause the controller to:

receive and monitor the first infrared sensor output signal generated by the first infrared sensor and a second infrared sensor output signal generated by the second infrared sensor to monitor for one or more temperature exceedances of the battery cells indicative of one or more thermal run-away conditions of the battery cells; and identify a location of a battery cell at which the one or more thermal run-away conditions have occurred based on the first infrared sensor output signal and the second infrared sensor output signal.

5. A method of detecting a thermal run-away condition of a battery pack, the method comprising:

generating, via an infrared sensor, a first infrared sensor output signal in response to incidence on the one or more infrared sensors of infrared radiation emitted by at least one battery cell of an array of battery cells of the battery pack;

monitoring, via a controller, the infrared sensor output signal to monitor for one or more temperature exceedances of battery cells of the battery pack, the one or more temperature exceedances being indicative of one or more thermal run-away conditions of the battery cells; and in response to the infrared sensor output signal being indicative of one or more thermal run-away conditions of the battery cells, output a thermal run-away signal indicating the occurrence of the one or more thermal run-away conditions of the battery cells.

6. The method of claim 5, wherein the battery pack is electrically connected with an electric motor of an electric vehicle, the method further comprising:

in response to the infrared sensor output signal being indicative of the one or more temperature exceedances of the battery cells, instructing the motor of the electric vehicle to enter a low-power state or to power down.

7. The method of claim 5, wherein the battery pack is electrically connected with an electric motor of an unmanned aerial vehicle (UAV), the method further comprising:

in response to the infrared sensor output signal being indicative of the one or more temperature exceedances of the battery cells, instructing a controller of the UAV to initiate a controlled landing.

8. The method of claim 5, wherein the battery pack is electrically connected with an electric motor of an autonomous or semi-autonomous automobile, the method further comprising:

in response to the infrared sensor output signal being indicative of the one or more temperature exceedances of the battery cells, instructing a controller of the autonomous or semi-autonomous automobile to initiate a controlled stop.

9. The method of claim 5, further comprising:

generating a second infrared sensor output signal, via a second infrared sensor, in response to incidence of infrared radiation on the second infrared sensor;

determining a location of the battery cell associated with the one or more temperature exceedances based on the first infrared sensor output signal and second infrared sensor output signal.

10. The method of claim 5, further comprising:

generating a second infrared sensor output signal, via a second infrared sensor, in response to incidence of infrared radiation on the second infrared sensor;

relaying the infrared sensor output signal and the second infrared sensor output signal to a common processor via a common bus.

11. The method of claim 5, further comprising:

generating a second infrared sensor output signal, via a second infrared sensor, in response to incidence of infrared radiation on the second infrared sensor;

generating a first thermal image from the infrared sensor output signal and a second thermal image from the second infrared sensor output signal;

assembling a composite thermal image by combining the respective first and second thermal images; and detecting the one or more temperature exceedances of the battery cells indicative of thermal run-away by identifying an irregularity in the composite thermal image.

12. The method of claim 11, further comprising:

determining a location of the battery cell at which the one or more temperature exceedances is detected based on a position of the irregularity in the composite thermal image.

13. A power supply device, comprising:

a battery pack comprising:

an enclosure comprising top and bottom elements comprising a plurality of electrical connection points; and an array of battery cells contained within the enclosure, the battery cells being connected with the top and bottom elements and electrically connected with the plurality of electrical connection points, the battery cells being spaced apart from each other, and each one of the battery cells being connected with the top element of the enclosure at a first end and with the bottom element of the enclosure at a second end;

one or more infrared sensors connected with the enclosure and configured to generate an infrared sensor output signal in response to incidence on the one or more infrared sensors of infrared radiation; and a controller comprising a processor and a memory device containing executable instructions that, when executed by the processor, cause the controller to:

receive the infrared sensor output signal from the one or more infrared sensors; and detect that a thermal run-away event has occurred in the battery pack based on the received infrared sensor output signal indicating that a temperature of an individual battery cell exceeds a threshold temperature.

14. The device of claim 13, wherein:

the thermal run-away event comprises a temperature exceedance that precedes thermal run-away; and the executable instructions, when executed by the processor, further cause the controller to reduce a power output of the battery pack to mitigate or reverse the thermal run-away event.

15. The device of claim 13, wherein at least one of a first interior surface of the top element of the enclosure, a second interior surface of the bottom element of the enclosure, or an outer shell of each one of the battery cells comprises a material having an infrared reflectivity of at least 0.2.

16. The device of claim 13, wherein the one or more infrared sensors generate the infrared sensor output signal in the form of image data comprising pixels, an intensity of each one of the pixels being indicative of an amount of infrared radiation collected by the one or more infrared sensors.

17. The device of claim 13, wherein:
the array of battery cells comprises first rows of battery cells aligned in a first direction and separated by a first channel between the battery cells; and
a first infrared sensor of the one or more infrared sensors is positioned at an end of the first channel and oriented to detect infrared radiation emitted and reflected by a subset of the battery cells adjacent to the first channel.

18. The device of claim 17, wherein:
the array of battery cells further comprises second rows of battery cells aligned in a second direction that intersects with the first rows of battery cells, the second rows of battery cells separated by a second channel between the battery cells that intersects with the first channel;
a second infrared sensor of the one or more infrared sensors is positioned at a second end of the second channel and oriented to detect infrared radiation emitted and reflected by a second subset of the battery cells adjacent to the second channel; and
the controller is further configured to identify, based on a first infrared sensor output signal generated by the first infrared sensor and a second infrared sensor output signal generated by the second infrared sensor, a position of a battery cell at which the one or more temperature exceedances as occurred.

19. The device of claim 13, wherein:
the array of battery cells comprises a closely packed hexagonal grid of the battery cells; and
the one or more infrared sensors are positioned at respective ends of a plurality of rows and columns of the battery cells in the array of battery cells, and oriented to detect infrared radiation emitted and reflected by subsets of the battery cells adjacent the respective rows and columns at which the one or more infrared sensors are positioned.

20. The device of claim 13, wherein the battery pack is electrically connected to power an electric motor of one of an unmanned aerial vehicle (UAV), electric vehicle (EV), or hybrid electric vehicle (HEV).

* * * * *